United States Patent
Gaurav et al.

(10) Patent No.: US 9,672,074 B2
(45) Date of Patent: Jun. 6, 2017

(54) METHODS AND SYSTEMS TO DETERMINE AND IMPROVE COST EFFICIENCY OF VIRTUAL MACHINES

(71) Applicant: VMWARE, INC., Palo Alto, CA (US)

(72) Inventors: Kumar Gaurav, Bangalore (IN); Piyush Masrani, Bangalore (IN); Ajay Gautam, Bangalore (IN)

(73) Assignee: VMware, Inc., Palo Alto, CA (US)

(*) Notice: Subject to any disclaimer, the term of this patent is extended or adjusted under 35 U.S.C. 154(b) by 0 days.

(21) Appl. No.: 14/985,484

(22) Filed: Dec. 31, 2015

(65) Prior Publication Data
US 2017/0109212 A1  Apr. 20, 2017

(30) Foreign Application Priority Data
Oct. 19, 2015  (IN) ............................ 5589/CHE/2015

(51) Int. Cl.
*G06F 9/455* (2006.01)
*G06F 9/50* (2006.01)
*H04L 29/08* (2006.01)

(52) U.S. Cl.
CPC ........ *G06F 9/5077* (2013.01); *G06F 9/45533* (2013.01); *G06F 9/45558* (2013.01); *H04L 67/10* (2013.01); *G06F 2009/4557* (2013.01); *G06F 2009/45583* (2013.01)

(58) Field of Classification Search
None
See application file for complete search history.

(56) References Cited

U.S. PATENT DOCUMENTS

| | | | | |
|---|---|---|---|---|
| 2011/0231899 A1* | 9/2011 | Pulier | ................. | G06F 9/45558 726/1 |
| 2011/0270968 A1* | 11/2011 | Salsburg | ............... | G06F 9/5072 709/224 |
| 2013/0268940 A1* | 10/2013 | Gmach | ................. | G06F 9/5077 718/104 |
| 2016/0055038 A1* | 2/2016 | Ghosh | ................. | G06F 9/45558 718/105 |

* cited by examiner

*Primary Examiner* — Dong Kim

(57) ABSTRACT

Methods and systems to compute cost efficiency of virtual machines ("VMs") running in a private cloud are described. Methods and systems compute a cost efficiency value for each VM in the private cloud based on cost of the VM in the private cloud, cost of similar VMs in the private cloud, price of similar VM running in the public cloud, and the cost of similar VMs running in one or more private clouds in the same geographical area. When the cost efficiency of a VM is greater than a cost efficiency threshold, the methods generate an alert and recommendations for moving the VM to a lower cost public cloud.

21 Claims, 32 Drawing Sheets

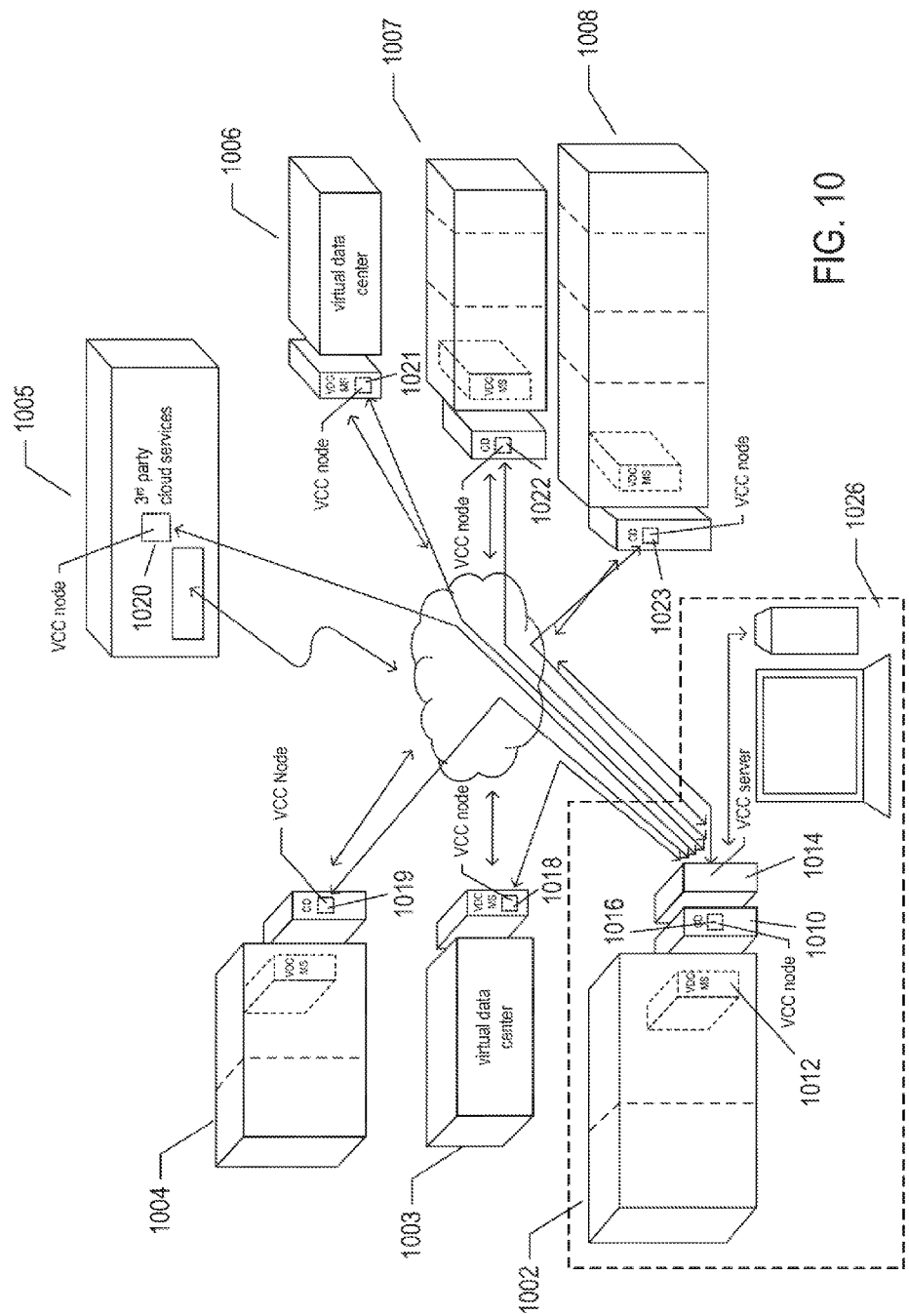

METHODS AND SYSTEMS TO DETERMINE AND IMPROVE COST EFFICIENCY OF VIRTUAL MACHINES

RELATED APPLICATIONS

Benefit is claimed under 35 U.S.C. 119(a)-(d) to Foreign application Serial No. 5589/CHE/2015 filed in India entitled "METHODS AND SYSTEMS TO DETERMINE AND IMPROVE COST EFFICIENCY OF VIRTUAL MACHINES", on Oct. 19, 2015, by VMware, Inc., which is herein incorporated in its entirety by reference for all purposes.

TECHNICAL FIELD

The present disclosure is directed to methods and system that determine cost efficiency of virtual machines in a private data center and generate recommendations to improve cost efficiency of the virtual machines.

BACKGROUND

With advances in cloud computing, enterprises have the option of deploying applications in a public cloud open for public use, a private cloudbuilt for exclusive use by the enterprise, or a hybrid of the public and private clouds. The applications are typically run as virtual machines ("VMs") that enable cloud managers to dynamically reallocate VMs based on demand. For example, a cloud computing facility that serves a large number of users during daytime business hours with a first VM may reallocate the same resources for a second VM used by nighttime customers located elsewhere in the world. A private cloud enables an enterprise to control data, security, and quality of service. A private cloud may be built and managed within the facilities of the enterprise or may be hosted externally by a private cloud service provider. In contrast, a public cloud is maintained by a public cloud provider that offers use of resources to a number of enterprises as a service. Public clouds typically enable enterprises to control cost by scaling up or down use of public cloud services and resources based on demand, and the enterprise reduces operational risk and cost of having to maintain private cloud resources.

Hybrid clouds are a combination of public and private cloud models. Hybrid clouds are typically used to provide a private cloud with additional resources offered by a public cloud. For example, an enterprise that typically relies on a private cloud may observe a workload spike at a particular time of day or month. In order to prevent interruptions in services, the enterprise uses the resources offered by a public cloud provider to handle the workload spike.

In recent years, many of the larger public cloud providers have begun offering resources and other services at competitive prices. Also, enterprises that maintain their own private clouds are bearing different costs of operations depending on the hardware they use, geographical location, and other factors. As a result, private cloud IT managers often have a difficult task of deciding which VMs to continue running in the private cloud and which VMs to move to a public cloud in order to lower costs. In particular, IT managers may want to know if they are currently spending more than the industry average by running certain VMs in their private cloud and want recommendations for improving the cost efficiency of each VM.

SUMMARY

Methods and systems compute a cost efficiency for each VM running in a private cloud. The cost efficiency is a metric used to evaluate effective use of the private cloud resources by each VM and may be used to generate recommendations as to which VMs should be move to a public cloud. Methods and systems compute a cost efficiency value for each VM in the private cloud based on cost of the VM in the private cloud cost of similar VMs in the private cloud, price of similar VM running in the public cloud, and the cost of similar VMs running in one or more private clouds in the same geographical area. When the cost efficiency of a VM is greater than a threshold, the methods generate an alert and recommend moving the VM to a lower cost public cloud.

DESCRIPTION OF THE DRAWINGS

FIG. 10 shows virtual-cloud-connector nodes.

DETAILED DESCRIPTION

Figure 1:
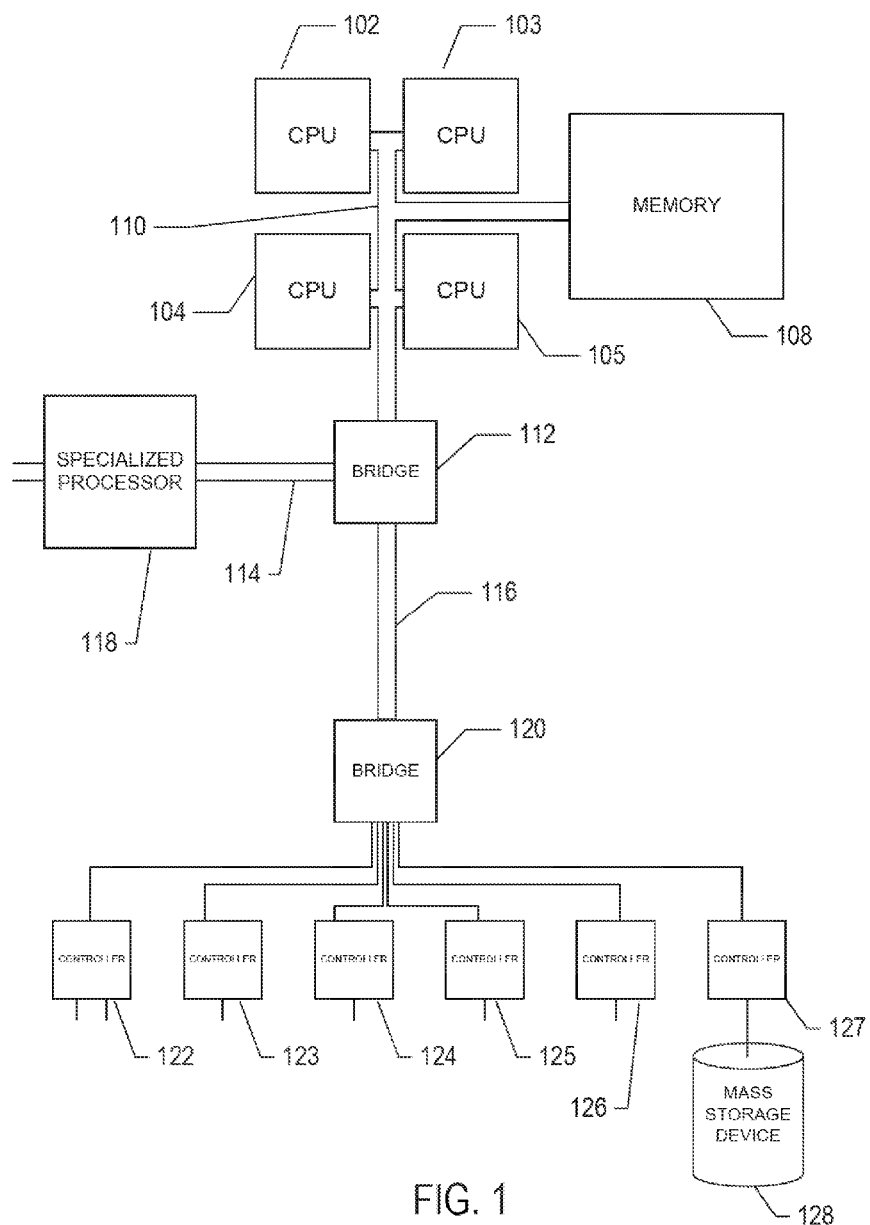
FIG. 1 shows a general architectural diagram for various types of computers.

This disclosure presents computational methods and systems to compute an efficiency coefficient for each virtual machine ("VM") in a private cloud. Computer hard, complex computational systems, and virtualization are described in a first subsection. Methods and systems to determine the cost efficiency for each VM in a private cloud are described in a second subsection.

Computer Hardware, Complex Computational Systems, and Virtualization

The term "abstraction" is not, in any way, intended to mean or suggest an abstract idea or concept. Computational abstractions are tangible, physical interfaces that are implemented, ultimately, using physical computer hardware, data-storage devices, and communications systems. Instead, the term "abstraction" refers, in the current discussion, to a logical level of functionality encapsulated within one or more concrete, tangible, physically-implemented computer systems with defined interfaces through which electronically-encoded data is exchanged, process execution launched, and electronic services are provided. Interfaces may include graphical and textual data displayed on physical display devices as well as computer programs and routines that control physical computer processors to carry out various tasks and operations and that are invoked through electronically implemented application programming interfaces ("APIs") and other electronically implemented interfaces. There is a tendency among those unfamiliar with modern technology and science to misinterpret the terms "abstract" and "abstraction," when used to describe certain aspects of modern computing. For example, one frequently encounters assertions that, because a computational system is described in terms of abstractions, functional layers, and interfaces, the computational system is somehow different from a physical machine or device. Such allegations are unfounded. One only needs to disconnect a computer system or group of computer systems from their respective power supplies to appreciate the physical, machine nature of complex computer technologies. One also frequently encounters statements that characterize a computational technology as being "only software," and thus not a machine or device. Software is essentially a sequence of encoded symbols, such as a printout of a computer program or digitally encoded computer instructions sequentially stored in a file on an optical disk or within an electromechanical mass-storage device. Software alone can do nothing. It is only when encoded computer instructions are loaded into an electronic memory within a computer system and executed on a physical processor that so-called "software implemented" functionality is provided. The digitally encoded computer instructions are an essential and physical control component of processor-controlled machines and devices, no less essential and physical than a cam-shaft control system in an internal-combustion engine. Multi-cloud aggregations, cloud-computing services, virtual-machine containers and VMs, communications interfaces, and many of the other topics discussed below are tangible, physical components of physical, electro-optical-mechanical computer systems.

FIG. 1 shows a general architectural diagram for various types of computers. Computers that receive, process, and store event messages may be described by the general architectural diagram shown in FIG. 1, for example. The computer system contains one or multiple central processing units ("CPUs") 102-105, one or more electronic memories 108 interconnected with the CPUs by a CPU/memory-subsystem bus 110 or multiple busses, a first bridge 112 that interconnects the CPU/memory-subsystem bus 110 with additional busses 114 and 116, or other types of high-speed interconnection media, including multiple, high-speed serial interconnects. These busses or serial interconnections, in turn, connect the CPUs and memory with specialized processors, such as a graphics processor 118, and with one or more additional bridges 120, which are interconnected with high-speed serial links or with multiple controllers 122-127, such as controller 127, that provide access to various different types of mass-storage devices 128, electronic displays, input devices, and other such components, subcomponents, and computational devices. It should be noted that computer-readable data-storage devices include optical and electromagnetic disks, electronic memories, and other physical data-storage devices. Those familiar with modern science and technology appreciate that electromagnetic radiation and propagating signals do not store data for subsequent retrieval, and can transiently "store" only a byte or less of information per mile, far less information than needed to encode even the simplest of routines.

Of course, there are many different types of computer-system architectures that differ from one another in the number of different memories, including different types of hierarchical cache memories, the number of processors and the connectivity of the processors with other system components, the number of internal communications busses and serial links, and in many other ways. However, computer systems generally execute stored programs by fetching instructions from memory and executing the instructions in one or more processors. Computer systems include general-purpose computer systems, such as personal computers ("PCs"), various types of servers and workstations, and higher-end mainframe computers, but may also include a plethora of various types of special-purpose computing devices, including data-storage systems, communications routers, network nodes, tablet computers, and mobile telephones.

Figure 2:
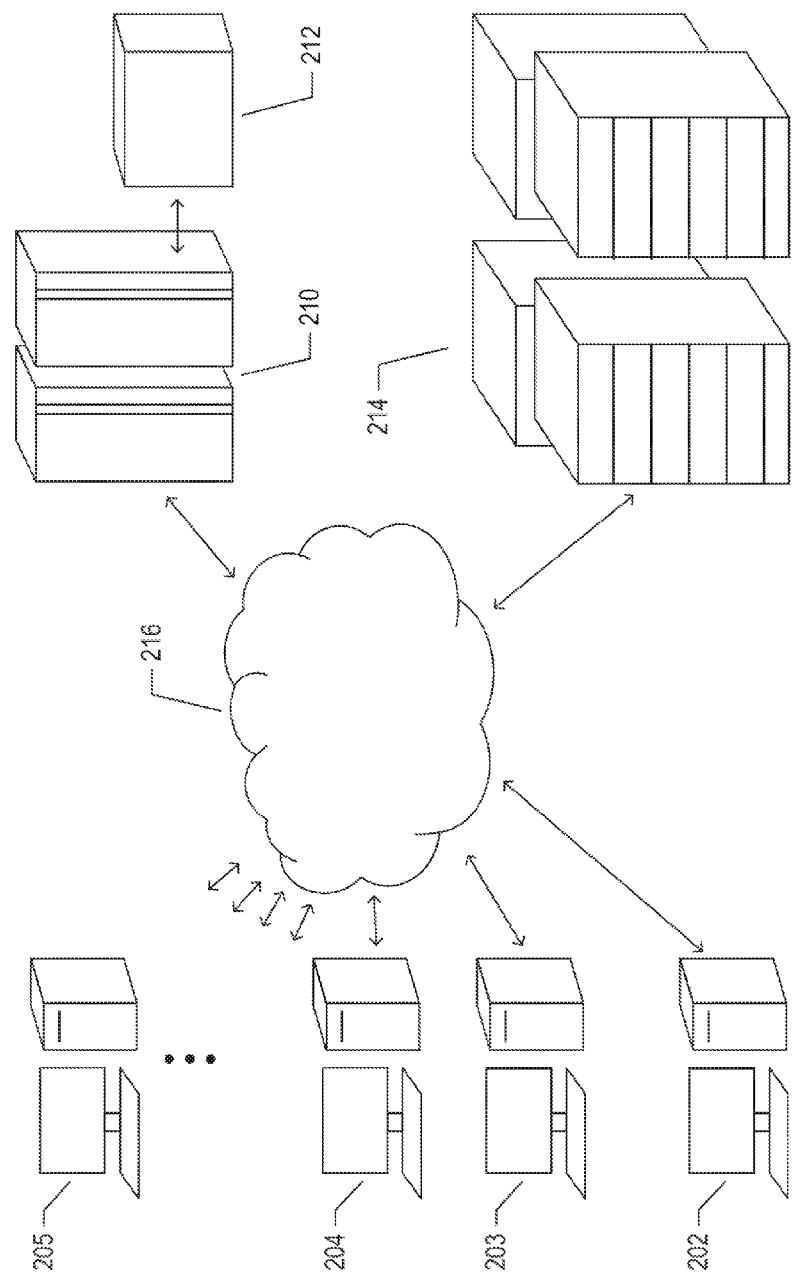
FIG. 2 shows an Internet-connected distributed computer system.

FIG. 2 shows an Internet-connected distributed computer system. As communications and networking technologies have evolved in capability and accessibility, and as the computational bandwidths, data-storage capacities, and other capabilities and capacities of various types of computer systems have steadily and rapidly increased, much of modem computing now generally involves large distributed systems and computers interconnected by local networks, wide-area networks, wireless communications, and the Internet. FIG. 2 shows a typical distributed system in which a large number of PCs 202-205, a high-end distributed mainframe system 210 with a large data-storage system 212, and a large computer center 214 with large numbers of rack-mounted servers or blade servers all interconnected through various communications and networking systems that together comprise the Internet 216. Such distributed computing systems provide diverse arrays of functionalities. For example, a PC user may access hundreds of millions of different web sites provided by hundreds of thousands of different web servers throughout the world and may access high-computational-bandwidth computing services from remote computer facilities for running complex computational tasks.

Until recently, computational services were generally provided by computer systems and data centers purchased, configured, managed, and maintained by service-provider organizations. For example, an e-commerce retailer generally purchased, configured, managed, and maintained a data center including numerous web servers, back-end computer systems, and data-storage systems for serving web pages to remote customers, receiving orders through the web-page interface, processing the orders, tracking completed orders, and other myriad different tasks associated with an e-commerce enterprise.

Figure 3:
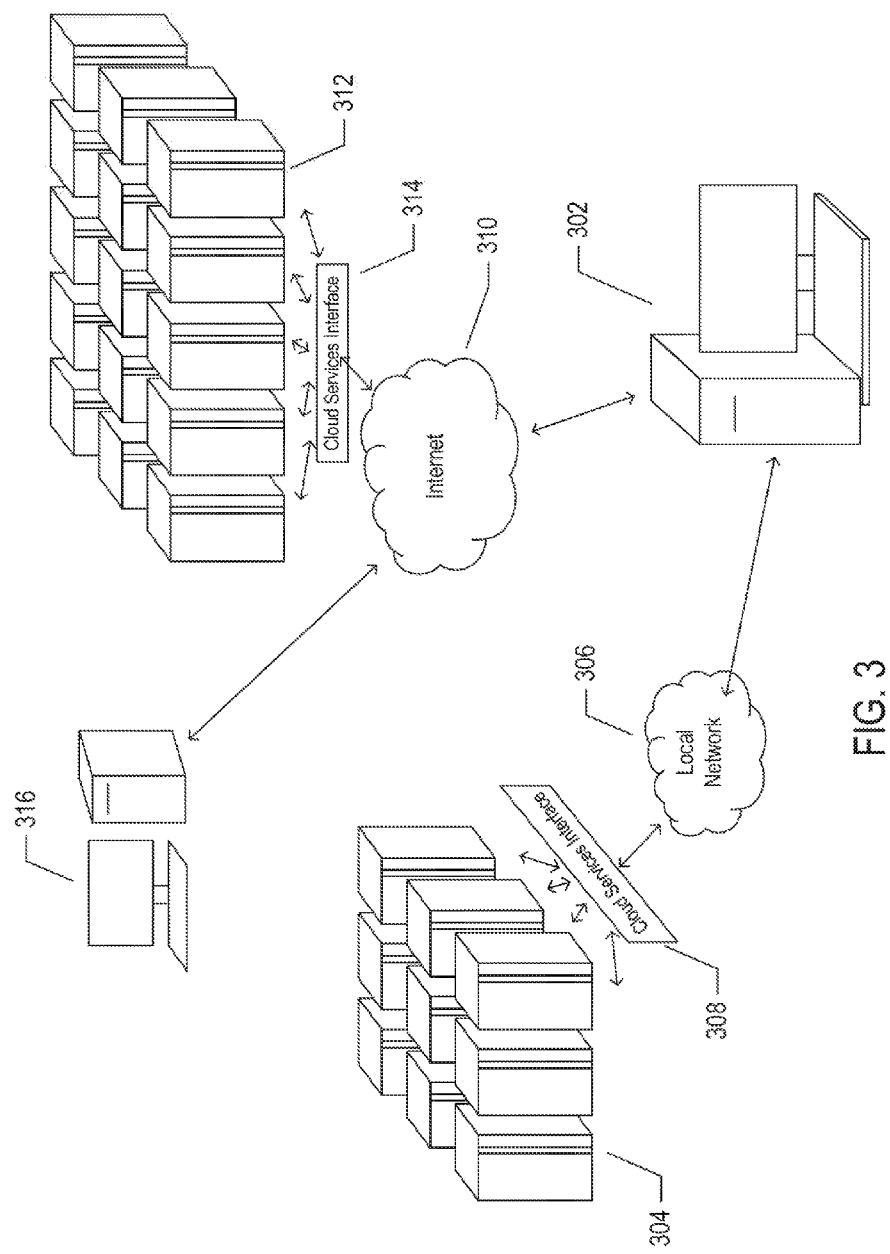
FIG. 3 shows cloud computing.

FIG. 3 shows cloud computing. In the recently developed cloud-computing paradigm, computing cycles and data-storage facilities are provided to organizations and individuals by cloud-computing providers. In addition, larger organizations may elect to establish private cloud-computing facilities in addition to, or instead of, subscribing to computing services provided by public cloud-computing service providers. In FIG. 3, a system administrator for an organization, using a PC 302, accesses the organization's private cloud 304 through a local network 306 and private-cloud interface 308 and also accesses, through the Internet 310, a public cloud 312 through a public-cloud services interface 314. The administrator can, in either the case of the private cloud 304 or public cloud 312, configure virtual computer systems and even entire virtual data centers and launch execution of application programs on the virtual computer systems and virtual data centers in order to carry out any of many different types of computational tasks. As one example, a small organization may configure and run a virtual data center within a public cloud that executes web servers to provide an e-commerce interface through the public cloud to remote customers of the organization, such as a user viewing the organization's e-commerce web pages on a remote user system 316.

Cloud-computing facilities are intended to provide computational bandwidth and data-storage services much as utility companies provide electrical power and water to consumers. Cloud computing provides enormous advantages to small organizations without the devices to purchase, manage, and maintain in-house data centers. Such organizations can dynamically add and delete virtual computer systems from their virtual data centers within public clouds in order to track computational-bandwidth and data-storage needs, rather than purchasing sufficient computer systems within a physical data center to handle peak computational-bandwidth and data-storage demands. Moreover, small organizations can completely avoid the overhead of maintaining and managing physical computer systems, including hiring and periodically retraining information-technology specialists and continuously paying for operating-system and database-management-system upgrades. Furthermore, cloud-computing interfaces allow for easy and straightforward configuration of virtual computing facilities, flexibility in the types of applications and operating systems that can be configured, and other functionalities that are useful even for owners and administrators of private cloud-computing facilities used by a single organization.

Figure 4:
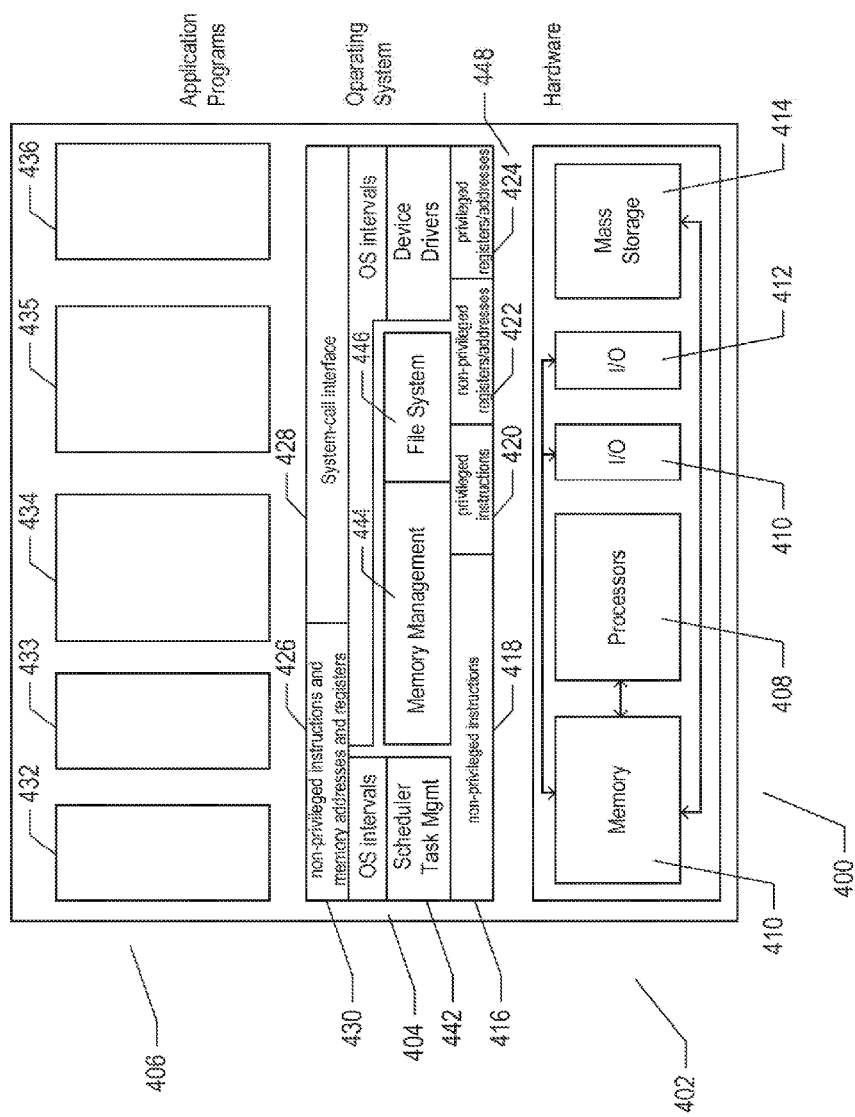
FIG. 4 shows generalized hardware and software components of a general-purpose computer system.

FIG. 4 shows generalized hardware and software components of a general-purpose computer system, such as a general-purpose computer system having an architecture similar to that shown in FIG. 1. The computer system 400 is often considered to include three fundamental layers: (1) a hardware layer or level 402; (2) an operating-system layer or level 404; and (3) an application-program layer or level 406. The hardware layer 402 includes one or more processors 408, system memory 410, various different types of input-output ("I/O") devices 410 and 412, and mass-storage devices 414. Of course, the hardware level also includes many other components, including power supplies, internal communications links and busses, specialized integrated circuits, many different types of processor-controlled or microprocessor-controlled peripheral devices and controllers, and many other components. The operating system 404 interfaces to the hardware level 402 through a low-level operating system and hardware interface 416 generally comprising a set of non-privileged computer instructions 418, a set of privileged computer instructions 420, a set of non-privileged registers and memory addresses 422, and a set of privileged registers and memory addresses 424. In general, the operating system exposes non-privileged instructions, non-privileged registers, and non-privileged memory addresses 426 and a system-call interface 428 as an operating-system interface 430 to application programs 432-436 that execute within an execution environment provided to the application programs by the operating system. The operating system, alone, accesses the privileged instructions, privileged registers, and privileged memory addresses. By reserving access to privileged instructions, privileged registers, and privileged memory addresses, the operating system can ensure that application programs and other higher-level computational entities cannot interfere with one another's execution and cannot change the overall state of the computer system in ways that could deleteriously impact system operation. The operating system includes many internal components and modules, including a scheduler 442, memory management 444, a file system 446, device drivers 448, and many other components and modules. To a certain degree, modern operating systems provide numerous levels of abstraction above the hardware level, including virtual memory, which provides to each application program and other computational entities a separate, large, linear memory-address space that is mapped by the operating system to various electronic memories and mass-storage devices. The scheduler orchestrates interleaved execution of various different application programs and higher-level computational entities, providing to each application program a virtual, stand-alone system devoted entirely to the application program. From the application program's standpoint, the application program executes continuously without concern for the need to share processor devices and other system devices with other application programs and higher-level computational entities. The device drivers abstract details of hardware-component operation, allowing application programs to employ the system-call interface for transmitting and receiving data to and from communications networks, mass-storage devices, and other I/O devices and subsystems. The file system 436 facilitates abstraction of mass-storage-device and memory devices as a high-level, easy-to-access, file-system interface. Thus, the development and evolution of the operating system has resulted in the generation of a type of multi-faceted virtual execution environment for application programs and other higher-level computational entities.

While the execution environments provided by operating systems have proved to be an enormously successful level of abstraction within computer systems, the operating-system-provided level of abstraction is nonetheless associated with difficulties and challenges for developers and users of application programs and other higher-level computational entities. One difficulty arises from the fact that there are many different operating systems that run within various different types of computer hardware. In many cases, popular application programs and computational systems are developed to run on only a subset of the available operating systems, and can therefore be executed within only a subset of the various different types of computer systems on which the operating systems are designed to run. Often, even when an application program or other computational system is ported to additional operating systems, the application program or other computational system can nonetheless run more efficiently on the operating systems for which the application program or other computational system was originally targeted. Another difficulty arises from the increasingly distributed nature of computer systems. Although distributed operating systems are the subject of considerable research and development efforts, many of the popular operating systems are designed primarily for execution on a single computer system. In many cases, it is difficult to move application programs, in real time, between the different computer systems of a distributed computer system for high-availability, fault-tolerance, and load-balancing purposes. The problems are even greater in heterogeneous distributed computer systems which include different types of hardware and devices running different types of operating systems. Operating systems continue to evolve, as a result of which certain older application programs and other computational entities may be incompatible with more recent versions of operating systems for which they are targeted, creating compatibility issues that are particularly difficult to manage in large distributed systems.

Figure 5A:
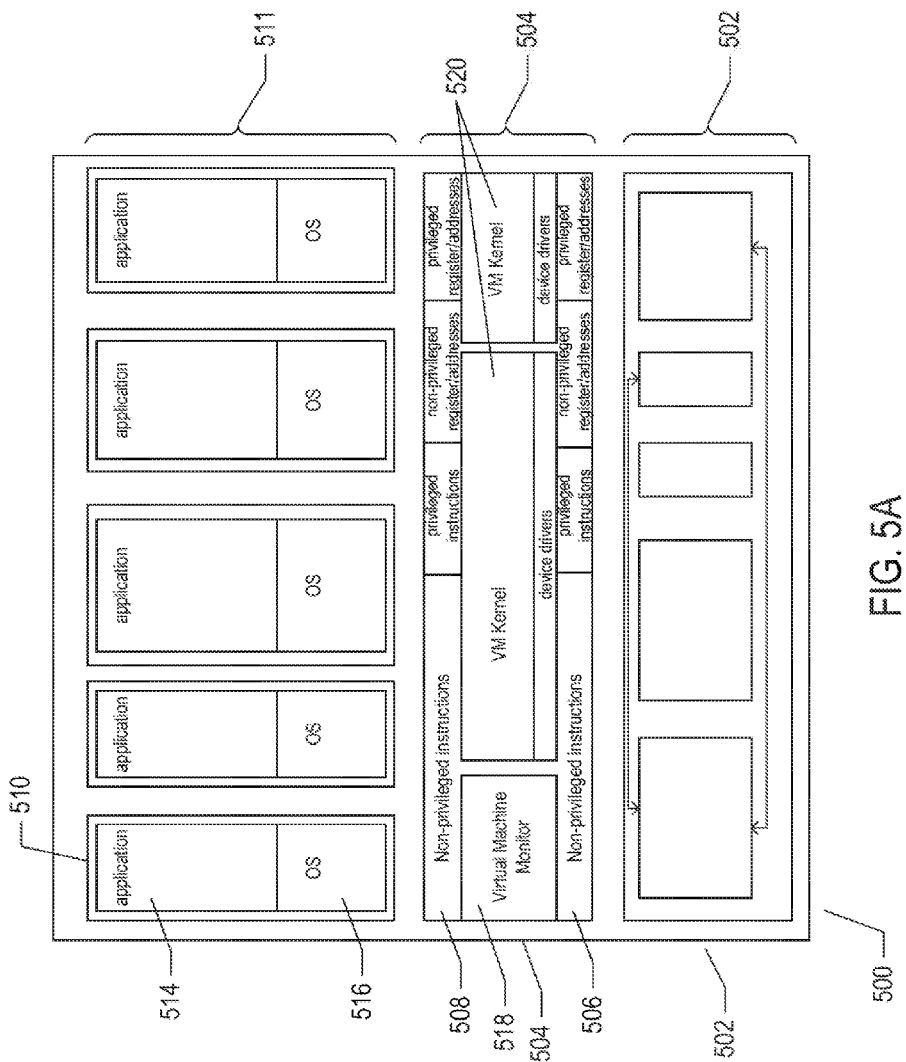
FIGS. 5A-5B show two types of virtual machine and virtual-machine execution environments.
Figure 5B:
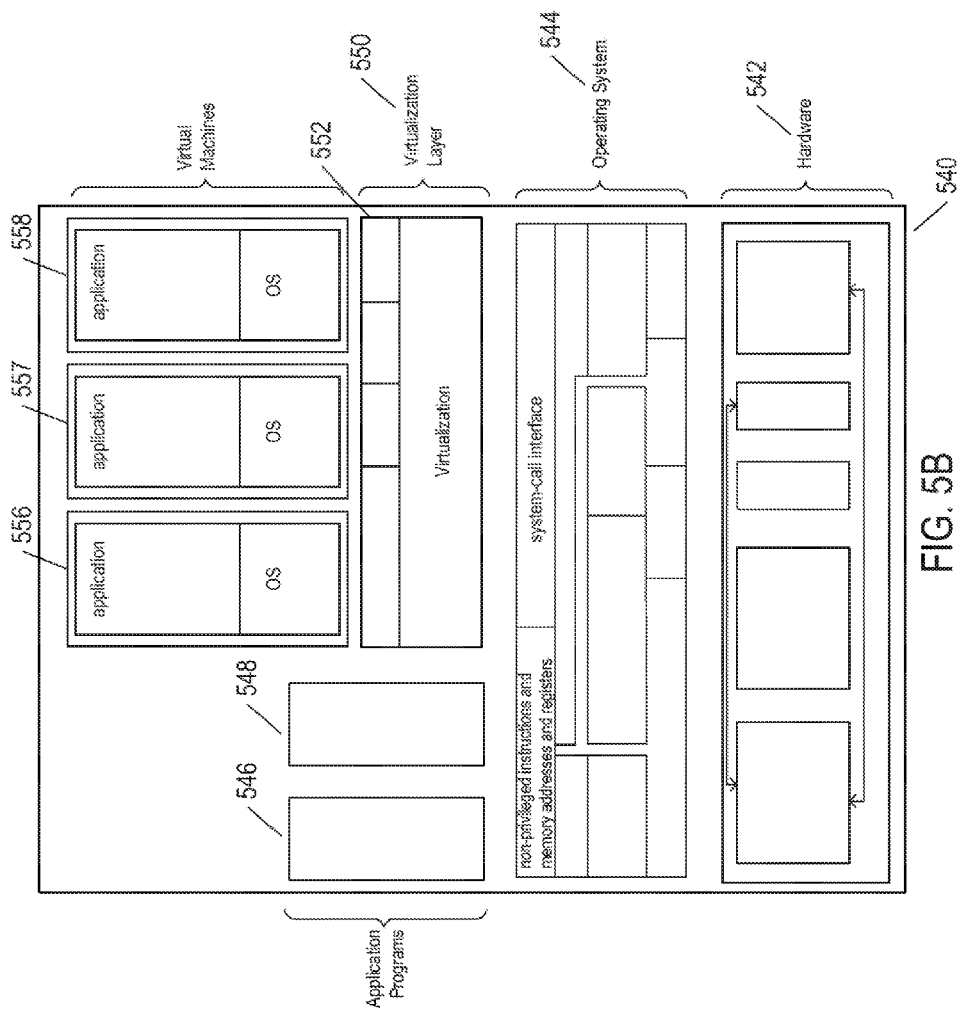

For all of these reasons, a higher level of abstraction, referred to as the "virtual machine," ("VM") has been developed and evolved to further abstract computer hardware in order to address many difficulties and challenges associated with traditional computing systems, including the compatibility issues discussed above. FIGS. 5A-B show two types of VM and virtual-machine execution environments. FIGS. 5A-B use the same illustration conventions as used in FIG. 4. FIG. 5A shows a first type of virtualization. The computer system 500 in FIG. 5A includes the same hardware layer 502 as the hardware layer 402 shown in FIG. 4. However, rather than providing an operating system layer directly above the hardware layer, as in FIG. 4, the virtualized computing environment shown in FIG. 5A features a virtualization layer 504 that interfaces through a virtualization-layer/hardware-layer interface 506, equivalent to interface 416 in FIG. 4, to the hardware. The virtualization layer 504 provides a hardware-like interface 508 to a number of VMs, such as VM 510, in a virtual-machine layer 511 executing above the virtualization layer 504. Each VM includes one or more application programs or other higher-level computational entities packaged together with an operating system, referred to as a "guest operating system," such as application 514 and guest operating system 516 packaged together within VM 510. Each VM is thus equivalent to the operating-system layer 404 and application-program layer 406 in the general-purpose computer system shown in FIG. 4. Each guest operating system within a VM interfaces to the virtualization-layer interface 508 rather than to the actual hardware interface 506. The virtualization layer 504 partitions hardware devices into abstract virtual-hardware layers to which each guest operating system within a VM interfaces. The guest operating systems within the VMs, in general, are unaware of the virtualization layer and operate as if they were directly accessing a true hardware interface. The virtualization layer 504 ensures that each of the VMs currently executing within the virtual environment receive a fair allocation of underlying hardware devices and that all VMs receive sufficient devices to progress in execution. The virtualization-layer interface 508 may differ for different guest operating systems. For example, the virtualization layer is generally able to provide virtual hardware interfaces for a variety of different types of computer hardware. This allows, as one example, a VM that includes a guest operating system designed for a particular computer architecture to run on hardware of a different architecture. The number of VMs need not be equal to the number of physical processors or even a multiple of the number of processors.

The virtualization layer 504 includes a virtual-machine-monitor module 518 ("VMM") that virtualizes physical processors in the hardware layer to create virtual processors on which each of the VMs executes. For execution efficiency, the virtualization layer attempts to allow VMs to directly execute non-privileged instructions and to directly access non-privileged registers and memory. However, when the guest operating system within a VM accesses virtual privileged instructions, virtual privileged registers, and virtual privileged memory through the virtualization-layer interface 508, the accesses result in execution of virtualization-layer code to simulate or emulate the privileged devices. The virtualization layer additionally includes a kernel module 520 that manages memory, communications, and data-storage machine devices on behalf of executing VMs ("VM kernel"). The VM kernel, for example, maintains shadow page tables on each VM so that hardware-level virtual-memory facilities can be used to process memory accesses. The VM kernel additionally includes routines that implement virtual communications and data-storage devices as well as device drivers that directly control the operation of underlying hardware communications and data-storage devices. Similarly, the VM kernel virtualizes various other types of I/O devices, including keyboards, optical-disk drives, and other such devices. The virtualization layer 504 essentially schedules execution of VMs much like an operating system schedules execution of application programs, so that the VMs each execute within a complete and fully functional virtual hardware layer.

FIG. 5B shows a second type of virtualization. In FIG. 5B, the computer system 540 includes the same hardware layer 542 and operating system layer 544 as the hardware layer 402 and the operating system layer 404 shown in FIG. 4. Several application programs 546 and 548 are shown running in the execution environment provided by the operating system 544. In addition, a virtualization layer 550 is also provided, in computer 540, but, unlike the virtualization layer 504 discussed with reference to FIG. 5A, virtualization layer 550 is layered above the operating system 544, referred to as the "host OS," and uses the operating system interface to access operating-system-provided functionality as well as the hardware. The virtualization layer 550 comprises primarily a VMM and a hardware-like interface 552, similar to hardware-like interface 508 in FIG. 5A. The virtualization-layer/hardware-layer interface 552, equivalent to interface 416 in FIG. 4, provides an execution environment for a number of VMs 556-558, each including one or more application programs or other higher-level computational entities packaged together with a guest operating system.

In FIGS. 5A-5B, the layers are somewhat simplified for clarity of illustration. For example, portions of the virtualization layer 550 may reside within the host-operating-system kernel, such as a specialized driver incorporated into the host operating system to facilitate hardware access by the virtualization layer.

It should be noted that virtual hardware layers, virtualization layers, and guest operating systems are all physical entities that are implemented by computer instructions stored in physical data-storage devices, including electronic memories, mass-storage devices, optical disks, magnetic disks, and other such devices. The term "virtual" does not, in any way, imply that virtual hardware layers, virtualization layers, and guest operating systems are abstract or intangible. Virtual hardware layers, virtualization layers, and guest operating systems execute on physical processors of physical computer systems and control operation of the physical computer systems, including operations that alter the physical states of physical devices, including electronic memories and mass-storage devices. They are as physical and tangible as any other component of a computer since, such as power supplies, controllers, processors, busses, and data-storage devices.

Figure 6:
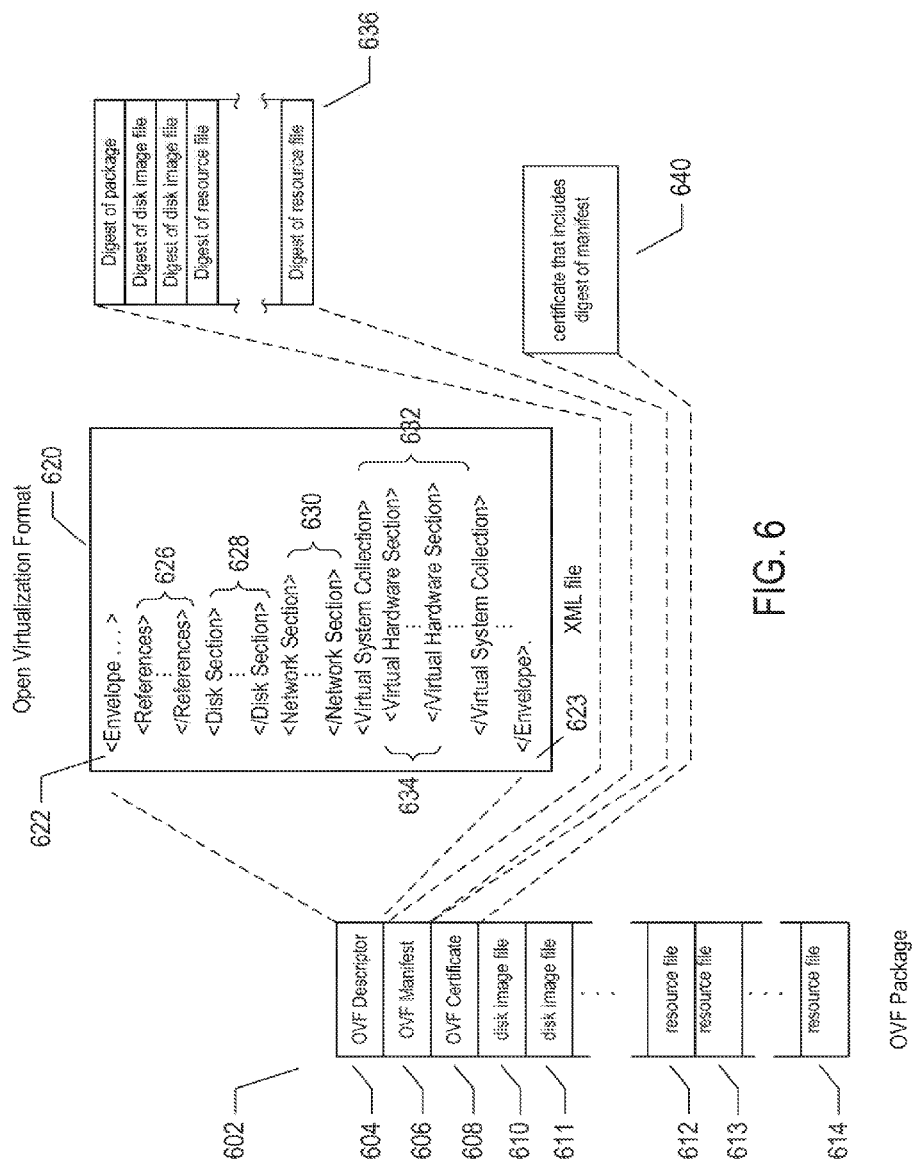
FIG. 6 shows an example of an open virtualization format package.

A VM or virtual application, described below, is encapsulated within a data package for transmission, distribution, and loading into a virtual-execution environment. One public standard for virtual-machine encapsulation is referred to as the "open virtualization format" ("OVF"). The OVF standard specifies a format for digitally encoding a VM within one or more data files. FIG. 6 shows an OVF package. An OVF package 602 includes an OVF descriptor 604, an OVF manifest 606, an OVF certificate 608, one or more disk-image files 610-611, and one or more device files 612-614. The OVF package can be encoded and stored as a single file or as a set of files. The OVF descriptor 604 is an XML document 620 that includes a hierarchical set of elements, each demarcated by a beginning tag and an ending tag. The outermost, or highest-level, element is the envelope element, demarcated by tags 622 and 623. The next-level element includes a reference element 626 that includes references to all files that are part of the OVF package, a disk section 628 that contains meta information about all of the virtual disks included in the OVF package, a networks section 630 that includes meta information about all of the logical networks included in the OVF package, and a collection of virtual-machine configurations 632 which further includes hardware descriptions of each VM 634. There are many additional hierarchical levels and elements within a typical OVF descriptor. The OVF descriptor is thus a self-describing, XML file that describes the contents of an OVF package. The OVF manifest 606 is a list of cryptographic-hash-function-generated digests 636 of the entire OVF package and of the various components of the OVF package. The OVF certificate 608 is an authentication certificate 640 that includes a digest of the manifest and that is cryptographically signed. Disk image files, such as disk image file 610, are digital encodings of the contents of virtual disks and device files 612 are digitally encoded content, such as operating-system images. A VM or a collection of VMs encapsulated together within a virtual application can thus be digitally encoded as one or more files within an OVF package that can be transmitted, distributed, and loaded using well-known tools for transmitting, distributing, and loading files. A virtual appliance is a software service that is delivered as a complete software stack installed within one or more VMs that is encoded within an OVF package.

The advent of VMs and virtual environments has alleviated many of the difficulties and challenges associated with traditional general-purpose computing. Machine and operating-system dependencies can be significantly reduced or entirely eliminated by packaging applications and operating systems together as VMs and virtual appliances that execute within virtual environments provided by virtualization layers running on many different types of computer hardware. A next level of abstraction, referred to as virtual data centers or virtual infrastructure, provide a data-center interface to virtual data centers computationally constructed within physical data centers.

Figure 7:
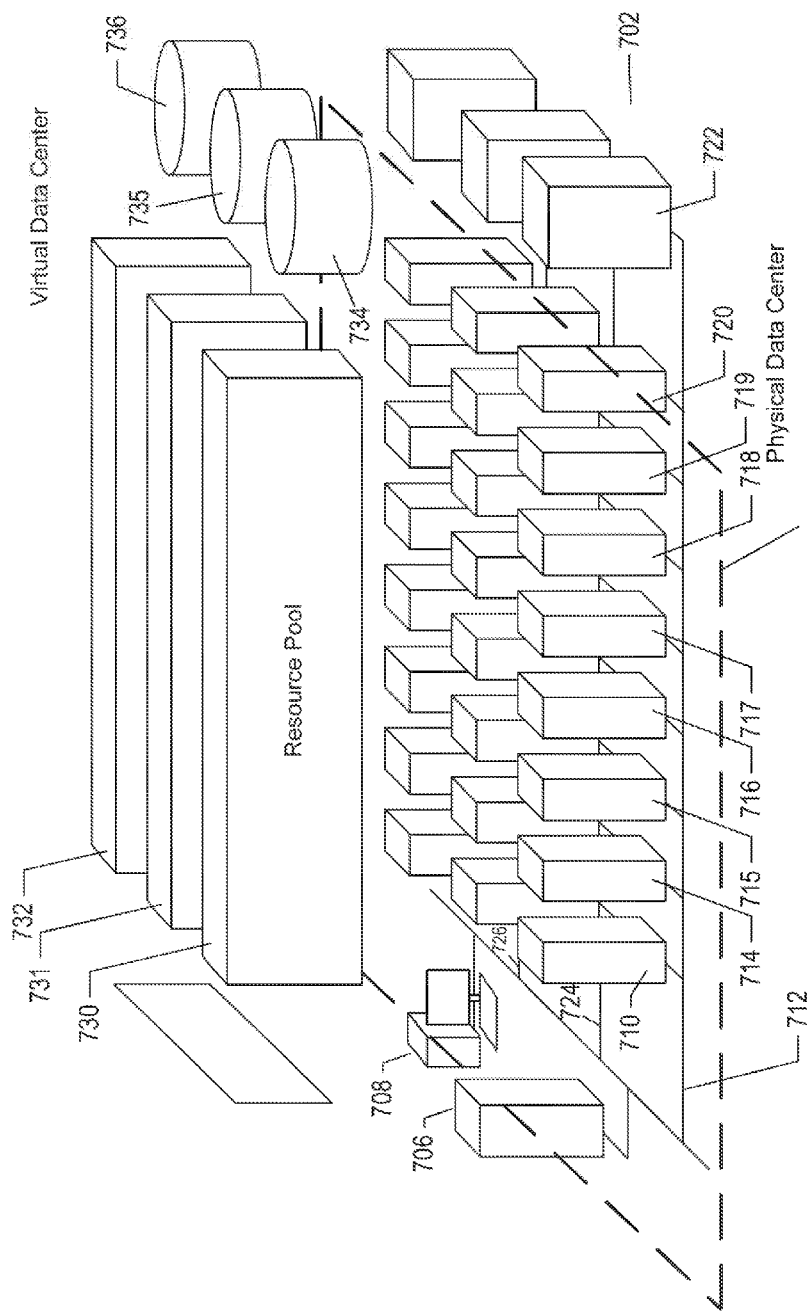
FIG. 7 shows virtual data centers provided as an abstraction of underlying physical-data-center hardware components.

FIG. 7 shows virtual data centers provided as an abstraction of underlying physical-data-center hardware components. In FIG. 7, a physical data center 702 is shown below a virtual-interface plane 704. The physical data center consists of a virtual-data-center management server 706 and any of various different computers, such as PCs 708, on which a virtual-data-center management interface may be displayed to system administrators and other users. The physical data center additionally includes generally large numbers of server computers, such as server computer 710, that are coupled together by local area networks, such as local area network 712 that directly interconnects server computer 710 and 714-720 and a mass-storage array 722. The physical data center shown in FIG. 7 includes three local area networks 712, 724, and 726 that each directly interconnects a bank of eight servers and a mass-storage array. The individual server computers, such as server computer 710, each includes a virtualization layer and runs multiple VMs. Different physical data centers may include many different types of computers, networks, data-storage systems and devices connected according to many different types of connection topologies. The virtual-interface plane 704, a logical abstraction layer shown by a plane in FIG. 7, abstracts the physical data center to a virtual data center comprising one or more device pools, such as device pools 730-732, one or more virtual data stores, such as virtual data stores 734-736, and one or more virtual networks. In certain implementations, the device pools abstract banks of physical servers directly interconnected by a local area network.

The virtual-data-center management interface allows provisioning and launching of VMs with respect to device pools, virtual data stores, and virtual networks, so that virtual-data-center administrators need not be concerned with the identities of physical-data-center components used to execute particular VMs. Furthermore, the virtual-data-center management server 706 includes functionality to migrate running VMs from one physical server to another in order to optimally or near optimally manage device allocation, provide fault tolerance, and high availability by migrating VMs to most effectively utilize underlying physical hardware devices, to replace VMs disabled by physical hardware problems and failures, and to ensure that multiple VMs supporting a high-availability virtual appliance are executing on multiple physical computer systems so that the services provided by the virtual appliance are continuously accessible, even when one of the multiple virtual appliances becomes compute bound, data-access bound, suspends execution, or fails. Thus, the virtual data center layer of abstraction provides a virtual-data-center abstraction of physical data centers to simplify provisioning, launching, and maintenance of VMs and virtual appliances as well as to provide high-level, distributed functionalities that involve pooling the devices of individual physical servers and migrating VMs among physical servers to achieve load balancing, fault tolerance, and high availability.

Figure 8:
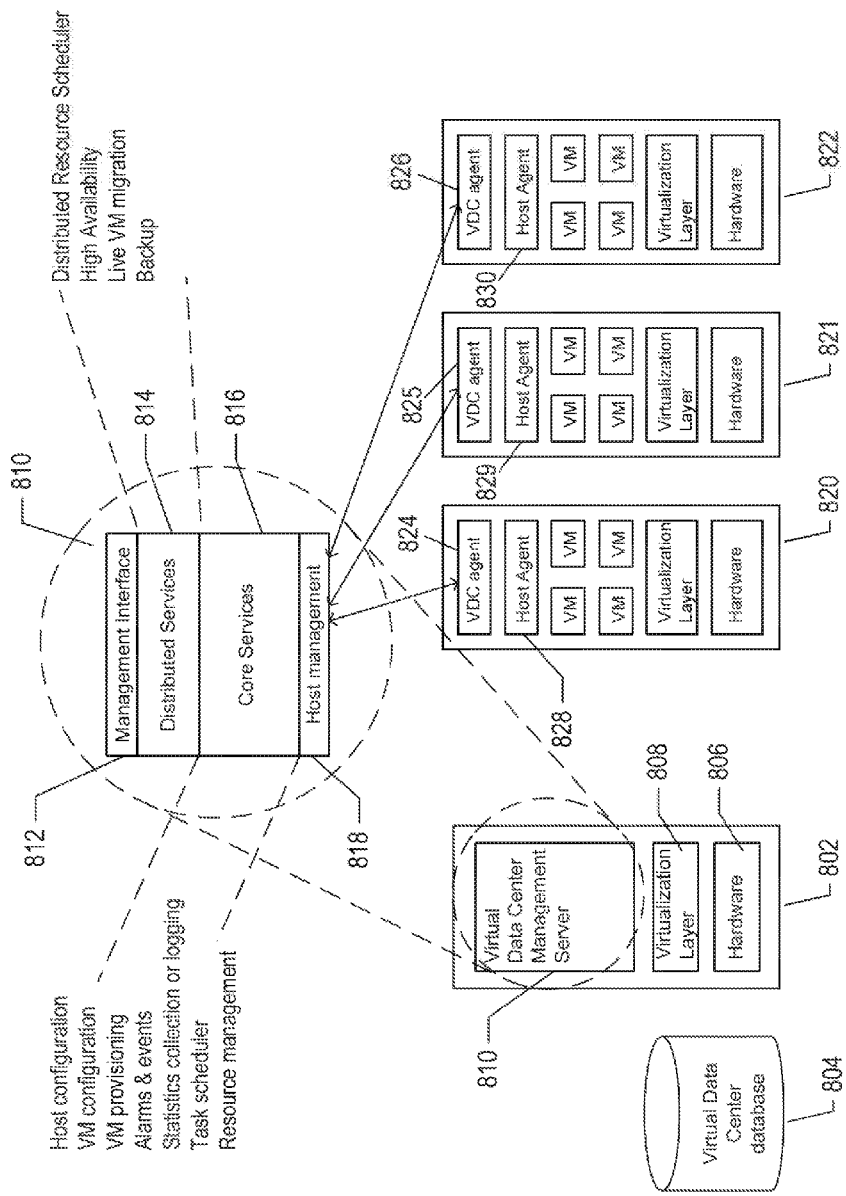
FIG. 8 shows virtual-machine components of a virtual-data-center management server and physical servers of a physical data center.

FIG. 8 shows virtual-machine components of a virtual-data-center management server and physical servers of a physical data center above which a virtual-data-center interface is provided by the virtual-data-center management server. The virtual-data-center management server 802 and a virtual-data-center database 804 comprise the physical components of the management component of the virtual data center. The virtual-data-center management server 802 includes a hardware layer 806 and virtualization layer 808, and runs a virtual-data-center management-server VM 810 above the virtualization layer. Although shown as a single server in FIG. 8, the virtual-data-center management server ("VDC management server") may include two or more physical server computers that support multiple VDC-management-server virtual appliances. The VM 810 includes a management-interface component 812, distributed services 814, core services 816, and a host-management interface 818. The management interface 818 is accessed from any of various computers, such as the PC 708 shown in FIG. 7. The management interface 818 allows the virtual-data-center administrator to configure a virtual data center, provision VMs, collect statistics and view log files for the virtual data center, and to carry out other, similar management tasks. The host-management interface 818 interfaces to virtual-data-center agents 824, 825, and 826 that execute as VMs within each of the physical servers of the physical data center that is abstracted to a virtual data center by the VDC management server.

The distributed services 814 include a distributed-device scheduler that assigns VMs to execute within particular physical servers and that migrates VMs in order to most effectively make use of computational bandwidths, data-storage capacities, and network capacities of the physical data center. The distributed services 814 further include a high-availability service that replicates and migrates VMs in order to ensure that VMs continue to execute despite problems and failures experienced by physical hardware components. The distributed services 814 also include a live-virtual-machine migration service that temporarily halts execution of a VM, encapsulates the VM in an OVF package, transmits the OVF package to a different physical server, and restarts the VM on the different physical server from a virtual-machine state recorded when execution of the VM was halted. The distributed services 814 also include a distributed backup service that provides centralized virtual-machine backup and restore.

The core services 816 provided by the VDC management server 810 include host configuration, virtual-machine configuration, virtual-machine provisioning, generation of virtual-data-center alarms and events, ongoing event logging and statistics collection, a task scheduler, and a device-management module. Each physical server 820-822 also includes a host-agent VM 828-830 through which the virtualization layer can be accessed via a virtual-infrastructure application programming interface ("API"). This interface allows a remote administrator or user to manage an individual server through the infrastructure API. The virtual-data-center agents 824-826 access virtualization-layer server information through the host agents. The virtual-data-center agents are primarily responsible for offloading certain of the virtual-data-center management-server functions specific to a particular physical server to that physical server. The virtual-data-center agents relay and enforce device allocations made by the VDC management server 810, relay virtual-machine provisioning and configuration-change commands to host agents, monitor and collect performance statistics, alarms, and events communicated to the virtual-data-center agents by the local host agents through the interface API, and to carry out other, similar virtual-data-management tasks.

The virtual-data-center abstraction provides a convenient and efficient level of abstraction for exposing the computational devices of a cloud-computing facility to cloud-computing-infrastructure users. A cloud-director management server exposes virtual devices of a cloud-computing facility to cloud-computing-infrastructure users. In addition, the cloud director introduces a multi-tenancy layer of abstraction, which partitions VDCs into tenant-associated VDCs that can each be allocated to a particular individual tenant or tenant organization, both referred to as a "tenant." A given tenant can be provided one or more tenant-associated VDCs by a cloud director managing the multi-tenancy layer of abstraction within a cloud-computing facility. The cloud services interface (308 in FIG. 3) exposes a virtual-data-center management interface that abstracts the physical data center.

Figure 9:
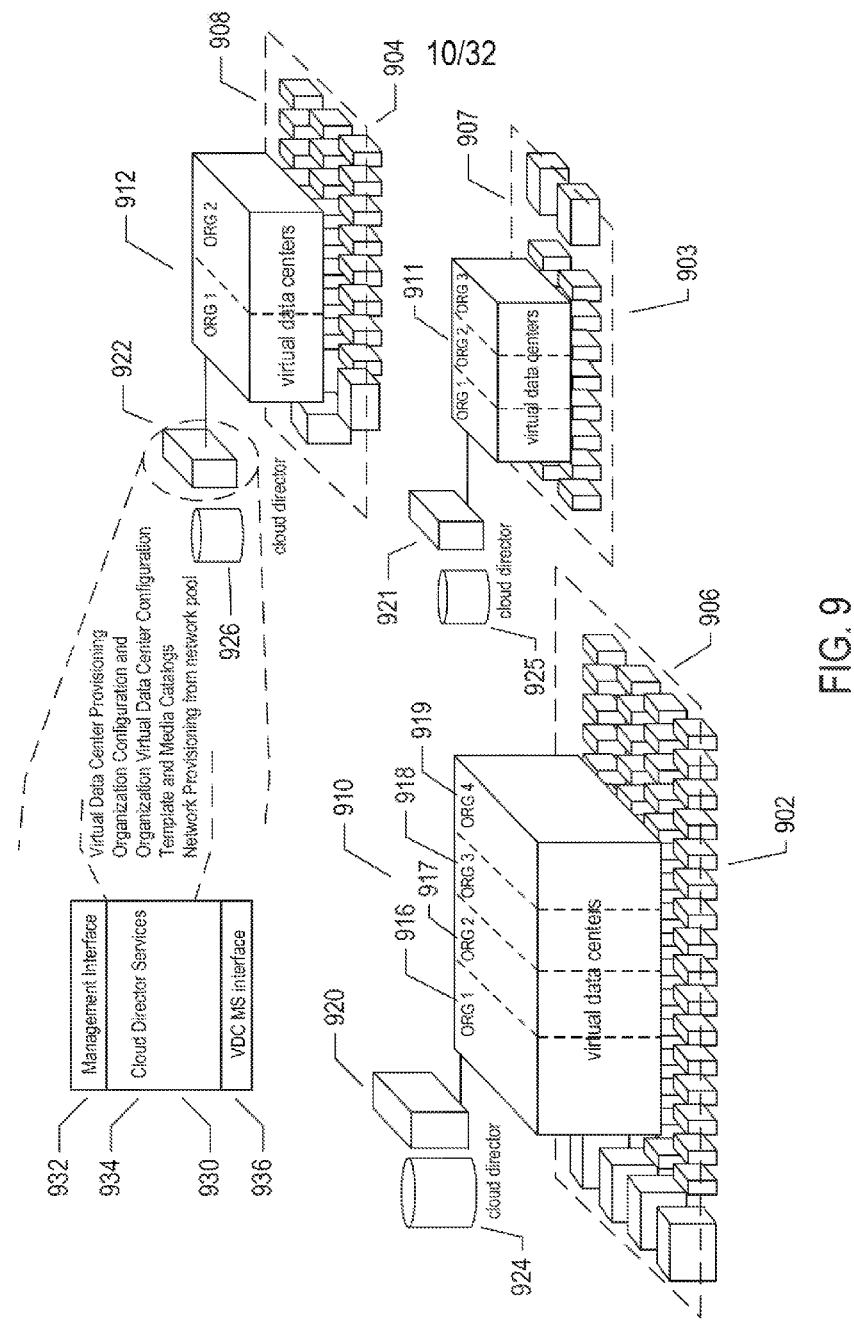
FIG. 9 shows a cloud-director level of abstraction.

FIG. 9 shows a cloud-director level of abstraction. In FIG. 9, three different physical data centers 902-904 are shown below planes representing the cloud-director layer of abstraction 906-908. Above the planes representing the cloud-director level of abstraction, multi-tenant virtual data centers 910-912 are shown. The devices of these multi-tenant virtual data centers are securely partitioned in order to provide secure virtual data centers to multiple tenants, or cloud-services-accessing organizations. For example, a cloud-services-provider virtual data center 910 is partitioned into four different tenant-associated virtual-data centers within a multi-tenant virtual data center for four different tenants 916-919. Each multi-tenant virtual data center is managed by a cloud director comprising one or more cloud-director servers 920-922 and associated cloud-director databases 924-926. Each cloud-director server or servers runs a cloud-director virtual appliance 930 that includes a cloud-director management interface 932, a set of cloud-director services 934, and a virtual-data-center management-server interface 936. The cloud-director services include an interface and tools for provisioning multi-tenant virtual data centers on behalf of tenants, tools and interfaces for configuring and managing tenant organizations, tools and services for organization of virtual data centers and tenant-associated virtual data centers within the multi-tenant virtual data center, services associated with template and media catalogs, and provisioning of virtualization networks from a network pool. Templates are VMs that each contains an OS and/or one or more VMs containing applications. A template may include much of the detailed contents of VMs and virtual appliances that are encoded within OVF packages, so that the task of configuring a VM or virtual appliance is significantly simplified, requiring only deployment of one OVF package. These templates are stored in catalogs within a tenant's virtual-data center. These catalogs are used for developing and staging new virtual appliances and published catalogs are used for sharing templates in virtual appliances across organizations. Catalogs may include OS images and other information relevant to construction, distribution, and provisioning of virtual appliances.

Considering FIGS. 7 and 9, the VDC-server and cloud-director layers of abstraction can be seen, as discussed above, to facilitate employment of the virtual-data-center concept within private and public clouds. However, this level of abstraction does not fully facilitate aggregation of single-tenant and multi-tenant virtual data centers into heterogeneous or homogeneous aggregations of cloud-computing facilities.

FIG. 10 shows virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds. VMware vCloud™ VCC servers and nodes are one example of VCC server and nodes. In FIG. 10, seven different cloud-computing facilities are shown 1002-1008. Cloud-computing facility 1002 is a private multi-tenant cloud with a cloud director 1010 that interfaces to a VDC management server 1012 to provide a multi-tenant private cloud comprising multiple tenant-associated virtual data centers. The remaining cloud-computing facilities 1003-1008 may be either public or private cloud-computing facilities and may be single-tenant virtual data centers, such as virtual data centers 1003 and 1006, multi-tenant virtual data centers, such as multi-tenant virtual data centers 1004 and 1007-1008, or any of various different kinds of third-party cloud-services facilities, such as third-party cloud-services facility 1005. An additional component, the VCC server 1014, acting as a controller is included in the private cloud-computing facility 1002 and interfaces to a VCC node 1016 that runs as a virtual appliance within the cloud director 1010. A VCC server may also run as a virtual appliance within a VDC management server that manages a single-tenant private cloud. The VCC server 1014 additionally interfaces, through the Internet, to VCC node virtual appliances executing within remote VDC management servers, remote cloud directors, or within the third-party cloud services 1018-1023. The VCC server provides a VCC server interface that can be displayed on a local or remote terminal, PC, or other computer system 1026 to allow a cloud-aggregation administrator or other user to access VCC-server-provided aggregate-cloud distributed services. In general, the cloud-computing facilities that together form a multiple-cloud-computing aggregation through distributed services provided by the VCC server and VCC nodes are geographically and operationally distinct.

Methods to Compute Cost Efficiency of Each VM Running in a Private Data Center

Figure 11A:
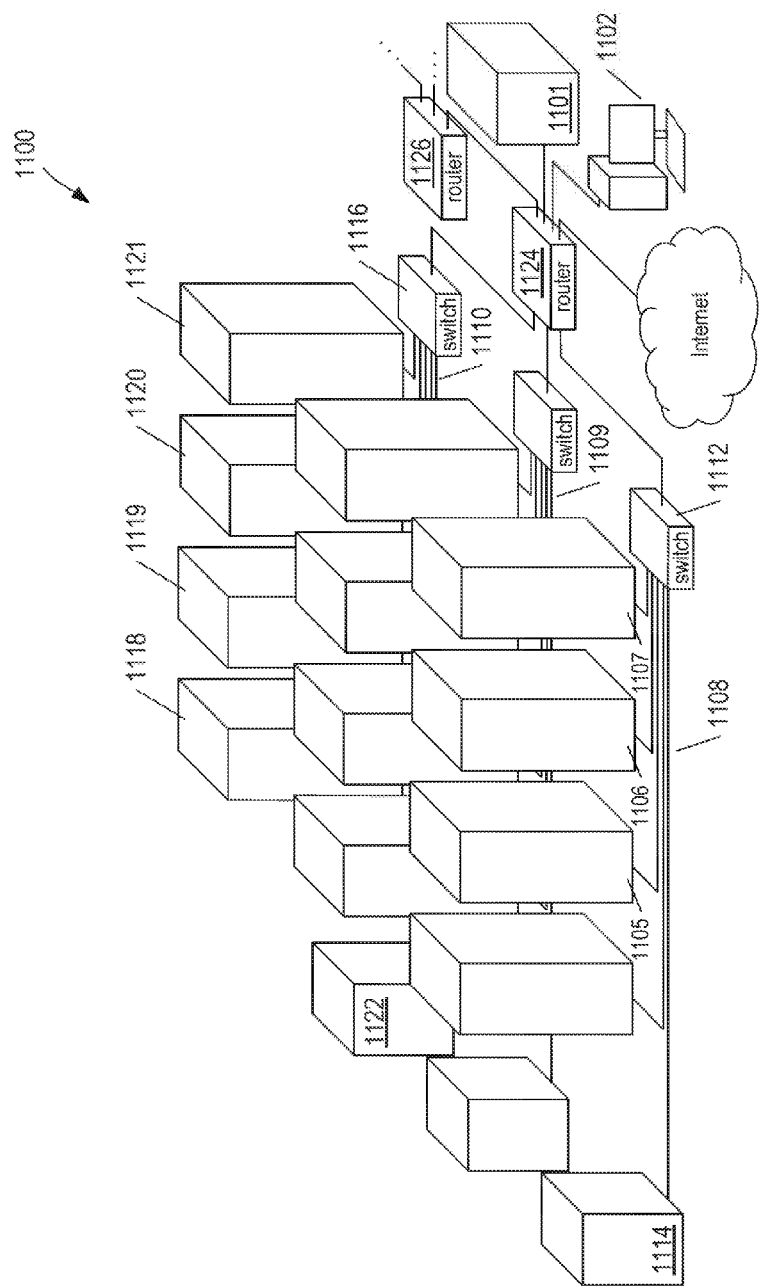
FIG. 11A shows an example of a physical data center.

FIG. 11A shows an example of a private physical data center 1100 that serves as a private cloud. The physical data center 1100 consists of a virtual-data-center management server 1101 and a PC 1102 on which a virtual-data-center management interface may be displayed to system administrators and other users. The physical data center 1100 additionally includes a number of hosts or server computers, such as server computers 1104-1107, interconnected to form three local area networks 1108-1110. For example, local area network 1108 includes a switch 1112 that interconnects the four servers 1104-1107 and a mass-storage array 1114 via Ethernet or optical cables and local area network 1110 includes a switch 1116 that interconnects four servers 1118-1121 and a mass-storage array 1122 via Ethernet or optical cables. In this example, the physical data center 1100 also includes a router 1124 that interconnects the LANs 1108-1110 and interconnects the LANS to the Internet, the virtual-data-center management server 1101, the PC 1102 and to a router 1126 that, in turn, interconnects other LANs composed of server computers and mass-storage arrays (not shown). In other words, the routers 1124 and 1126 are interconnected to form a larger network of server computers.

A resource is any physical or virtual component of the physical data center with limited availability. For example, resources include physical CPU, memory, and storage capacity and virtual CPU ("vCPU"), memory, and storage capacity.

Figure 11B:
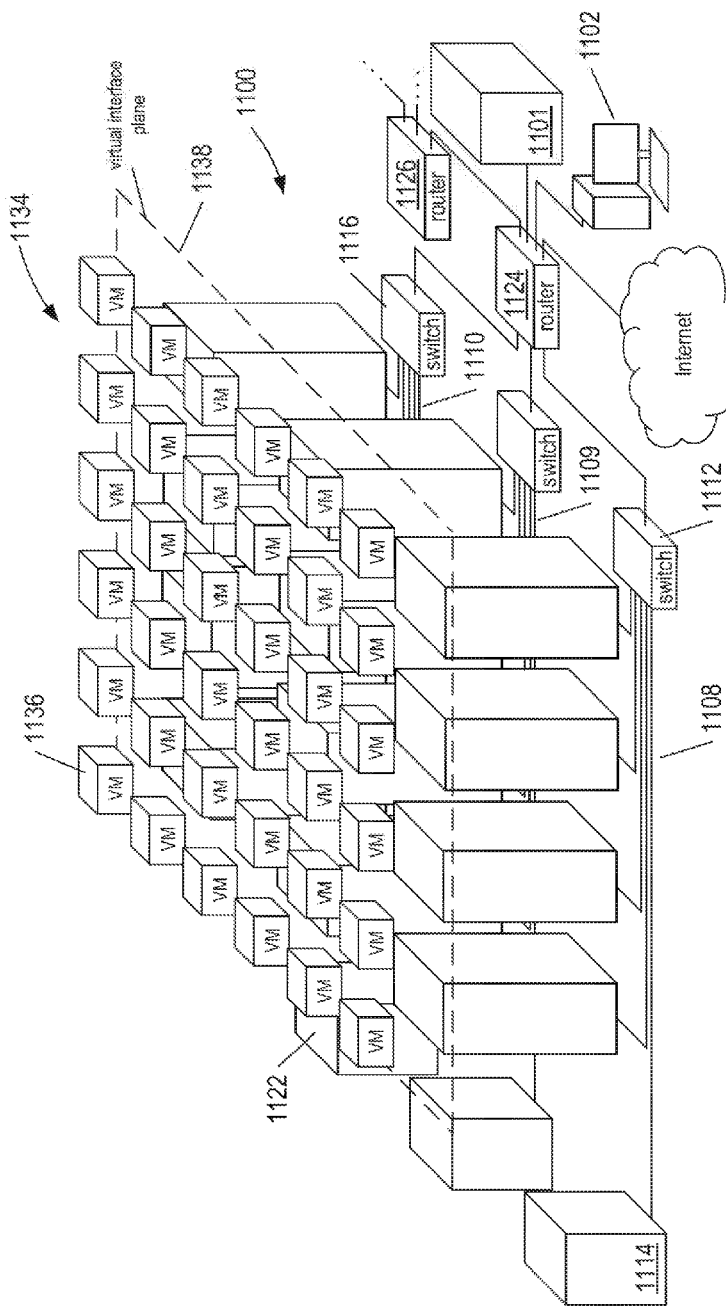
FIG. 11B shows an example set of thirty-six virtual machines ("VMs") above a virtual interface plane of the physical data center shown in FIG. 11A.

FIG. 11B shows an example set of thirty-six VMs 1134, such as VM 1136, above a virtual interface plane 1138. The set of VMs 1134 may be partitioned to run on different servers, and because the VMs are not bound physical devices, the VMs may be moved to different server computers in order to increase efficient use of the server computer resources within the physical data center 1100. For example, when demand for a VM running on one server computer increases and the server computer resources are insufficient to handle the demand, the VM may be moved to a different server computer with more resources within the physical data center 1100. Moving VMs between server computers within the same physical data center is typically done to increase computational efficiency of each VM.

On the other hand, the methods described below are directed to determining the cost efficiency of each VM running in a private cloud and based on the cost efficiency associated with each VM generate suggestions regarding which VMs should be moved to the public cloud or moved to different private cloud to lower costs. Considering just a VM's cost is not enough to determine whether or not a VM should remain in the private cloud or be moved to a different private cloud or to a public cloud. It should be noted that although methods are described below with respect to CPU, memory, and storage capacity, the methods are not intended to be limited just to computing the cost of VMs entirely on CPU, memory, and storage capacity. Methods may be scaled to include other factors, such as, but not limited to, network usage, disk read/writes, and IP address.

Figure 12:
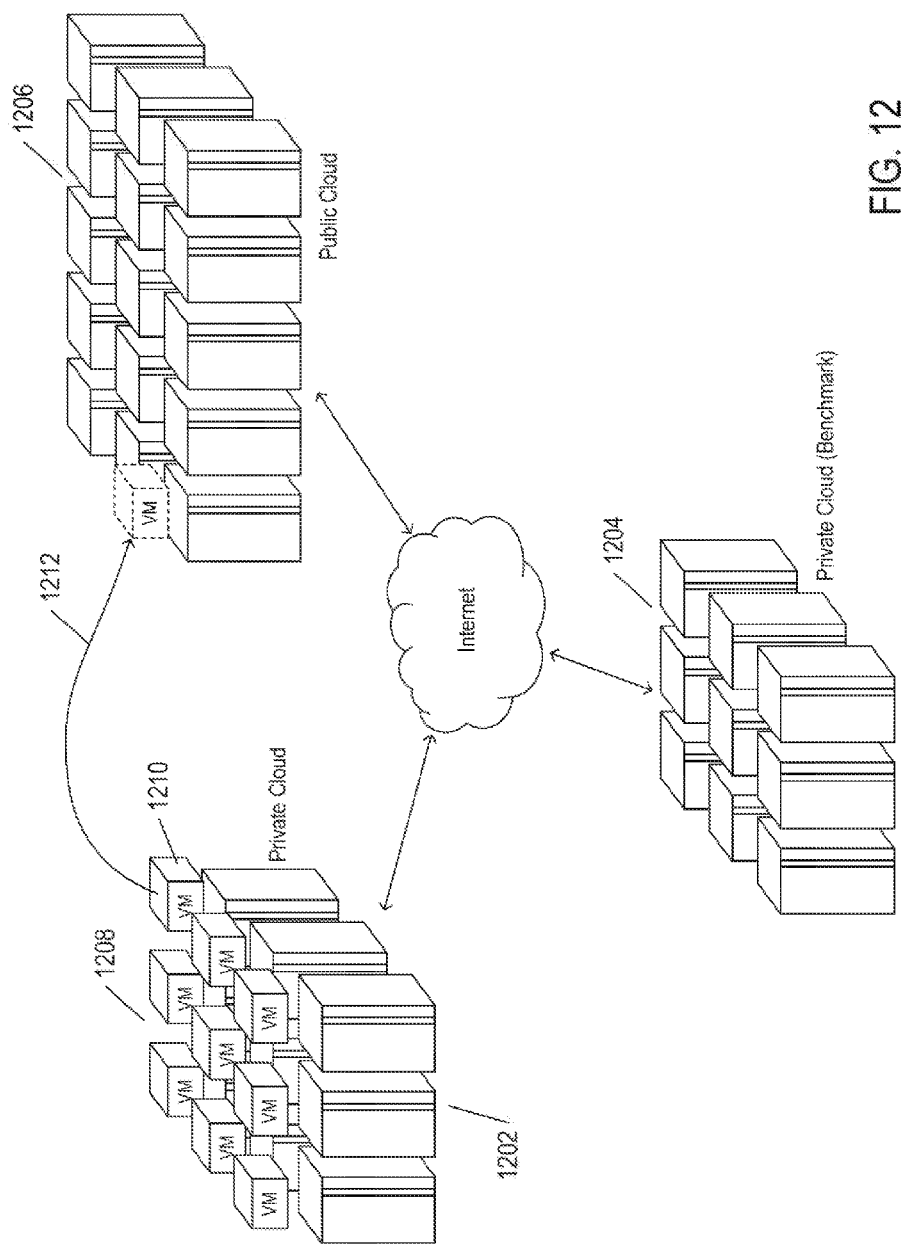
FIG. 12 shows an overview of a private cloud, a benchmark private cloud, and a public cloud.

FIG. 12 shows an overview of a private cloud 1202, a second private cloud 1204 in the same geographical area that serves as a "benchmark" private cloud, and a public cloud 1206. FIG. 12 also shows a set of similar VMs 1208 called a "VM cluster" running in the private cloud 1202. The VM cluster 1208 is composed of VMs that have similar virtual CPU speed, memory, and storage capacity. Methods and systems described below compute a cost efficiency for each VM in the VM cluster 1208 based on (1) the cost of running each VM, such as VM 1210, in the private cloud 1202, (2) cost of running the other VMs in the same VM cluster 1208, (3) cost of running similar VMs in the public cloud 1206, and (4) the cost of running similar VMs in the benchmark private cloud 1204. The cost efficiency of each VM is compared with a threshold to determine whether or not the VM should remain in the private cloud 1202 or a suggestion should be generated to move the VM to the public cloud 1206 or to a different private cloud. For example, when the cost efficiency of the VM 1210 is greater than the threshold, the methods generate an alert and a suggestion to move 1212 the VM 1210 to the public cloud 1206 or to another private cloud, such as the benchmark private cloud 1204.

Methods to compute cost efficiency of each VM in a private cloud are now described. Virtual CPU, memory, and storage capacity of each VM running a private cloud are collected. The private cloud can be a single private physical data center, as shown in FIG. 11A, or the private cloud may be composed of two or more private physical data centers.

Figure 13:
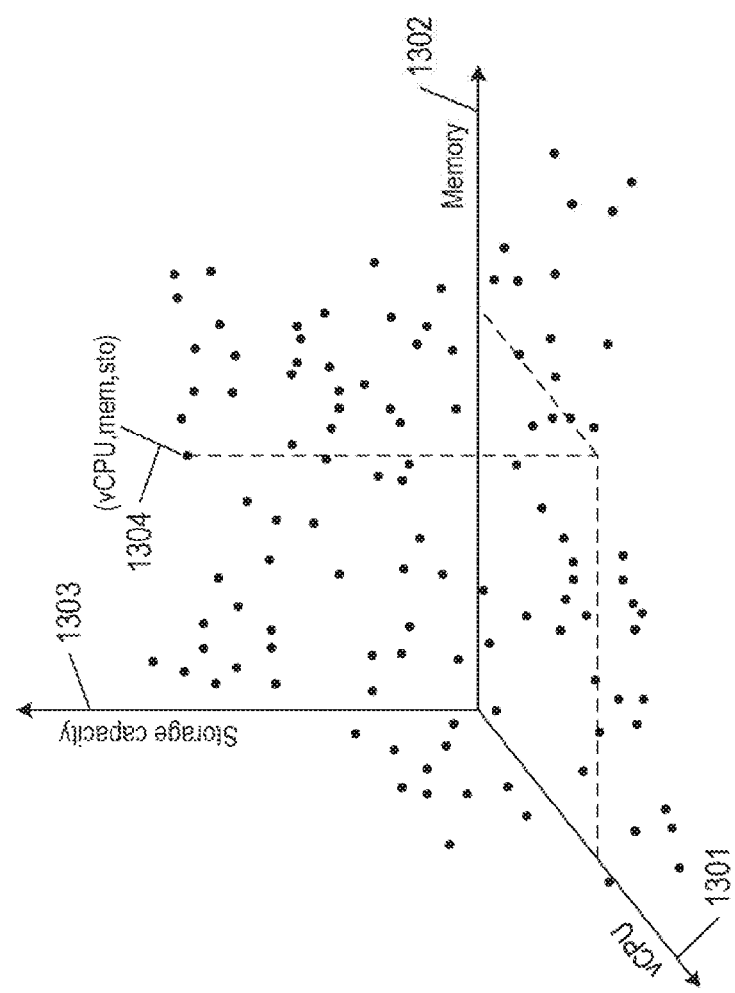
FIG. 13 shows a three-dimensional plot of VM data points.

FIG. 13 shows a three-dimensional plot of VM data points. Each VM data point represents the virtual CPU, memory, and storage capacity of one VM running in a private cloud. Axes 1301-1303 represent virtual CPU, memory, storage capacity, respectively, that defines a three-dimensional coordinate system for each of the VM running in the private cloud. For example, VM data point 1304 has coordinates denoted by (vCPU, mem, sto), where "vCPU," "mem," and "sto" represent the virtual CPU, memory, and storage capacity values of one of the VMs running in the private cloud.

The VMs are then clustered according to how similar the virtual CPU, memory, and storage capacities of the VMs are to one another. In order to determine clusters of similar VMs, the virtual CPU, memory, and storage capacity values are scaled to indicate the level of importance as follows:

$$(vCPU, mem, sto) \rightarrow \overrightarrow{VM} = (\eta_c \cdot vCPU, \eta_m \cdot mem, \eta_s \cdot \log_{10}(sto)) \quad (1)$$

where $\eta_c$ is a CPU scale factor;

$\eta_m$ is a memory scale factor;

$\eta_s$ is a storage capacity scale; and $\overrightarrow{VM}$ denotes a scaled VM data point.

For example, virtual CPU may be considered by an IT administrator to be the most important component of the VM, and virtual storage capacity the least important. As a result, the scale factors may be selected so that $\eta_c > \eta_m > \eta_s$. The quantities $\eta_c \cdot vCPU$, $\eta_m \cdot mem$, and $\eta_s \cdot \log_{10}(sto)$ are called scaled CPU value, scaled memory value, and scaled storage capacity value, respectively.

Figure 14:
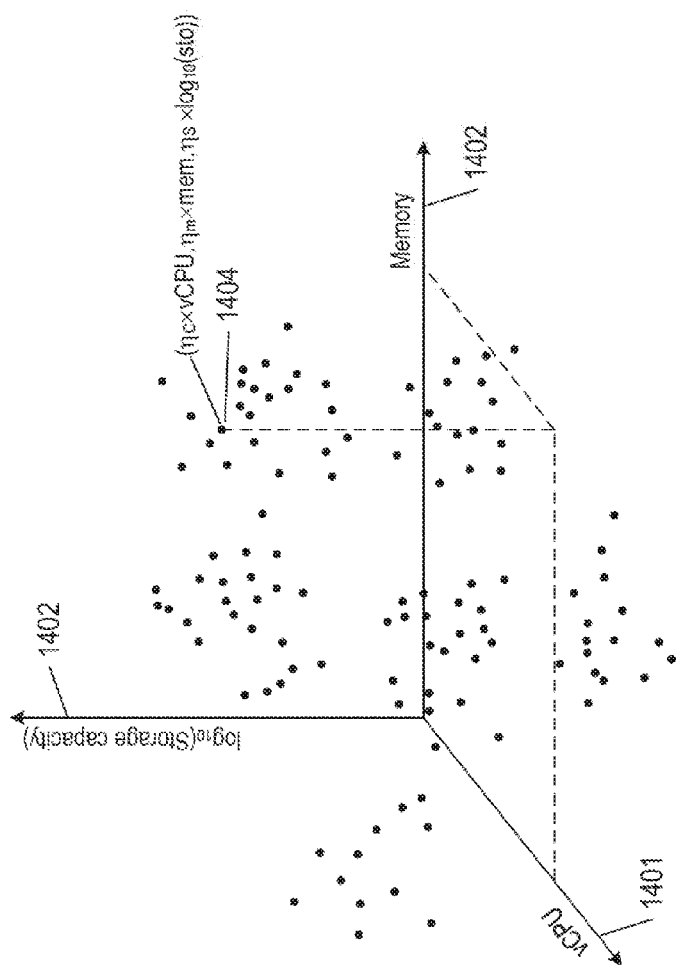
FIG. 14 shows a three-dimensional plot of scaled VM data points.

FIG. 14 shows a three-dimensional plot of scaled VM data points. Axes 1401 and 1402 correspond to the vCPU and memory axes 1301 and 1302, respectively. Axis 1403 represents the logarithm base 10 of the storage capacity. Each scaled VM data point represents scaled virtual CPU, memory, and storage capacity coordinates of the VM data points shown in FIG. 13 according to Equation (1). For example, a scaled VM data point 1404 corresponds to the VM data point 1304 in FIG. 13 with coordinates scaled according to Equation (1).

K-means clustering may then be used to partition the VMs into clusters of similar VMs based on the scaled VM data points $\overrightarrow{VM}$. K-means clustering is an unsupervised machine learning technique used to identify structure in a data set. K-means clustering treats the scaled VM data points, $\overrightarrow{VM}$, as though the scaled VM data points lie in a three-dimensional space as illustrated in FIG. 14. K-means clustering receives the scaled VM data points and sets of clusters $\{C_s\}_{s=1}^S$ among which the scaled VM data points are to be partitioned, where S is the number of clusters. K-means clustering minimizes a cluster sum of squares given by:

$$\operatorname*{argmin}_c \sum_{s=1}^S \sum_{VM_L \in C_s} \|\overrightarrow{VM}_L - \overrightarrow{Z}_s\|^2 \quad (2)$$

where $\overrightarrow{VM}_L$ represents the scaled VM data point of the L-th VM in the private cloud; and $\overrightarrow{Z}_s$ is the centroid of the cluster $C_s$.

Given S randomly generated initial values $Z_1^0 Z_2^0, \ldots, Z_S^0$ for the cluster centroids, K-means clustering iteratively proceeds through assignment and update steps until convergence. At each step, each scaled VM data point $\overrightarrow{VM}_L$ is assigned to a cluster $C_s^t$ with the closest centroid $\overrightarrow{Z}_s^t$, and the centroid of each cluster is updated according to $$Z_s^{t+1} = \frac{1}{|C_s^t|} \sum_{VM_L \in C_s^t} \overrightarrow{VM}_L \quad (3)$$

Embodiments are not intended to be limited to K-means clustering. In other implementations, other clustering methods may be used.

Figure 15:
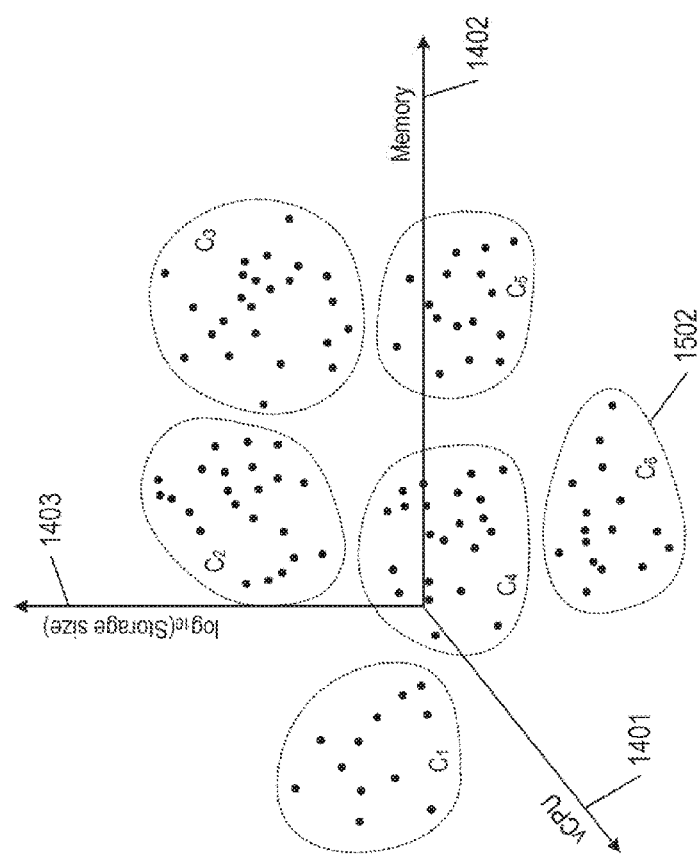
FIG. 15 shows an example of clustered scaled VM data points.

FIG. 15 shows an example of six clusters of scaled VM data points (i.e., S=6). The six different VM clusters are denoted by $C_1$, $C_2$, $C_3$, $C_4$, $C_5$, and $C_6$ after K-means clustering has been applied to the scaled VM data values shown in FIG. 14. VMs with scaled VM data values that belong to a cluster are considered similar VMs. For example, the scaled VM data points encircled by dashed curve 1502 belong to VM cluster $C_6$ and are considered similar VMs.

Figure 16:
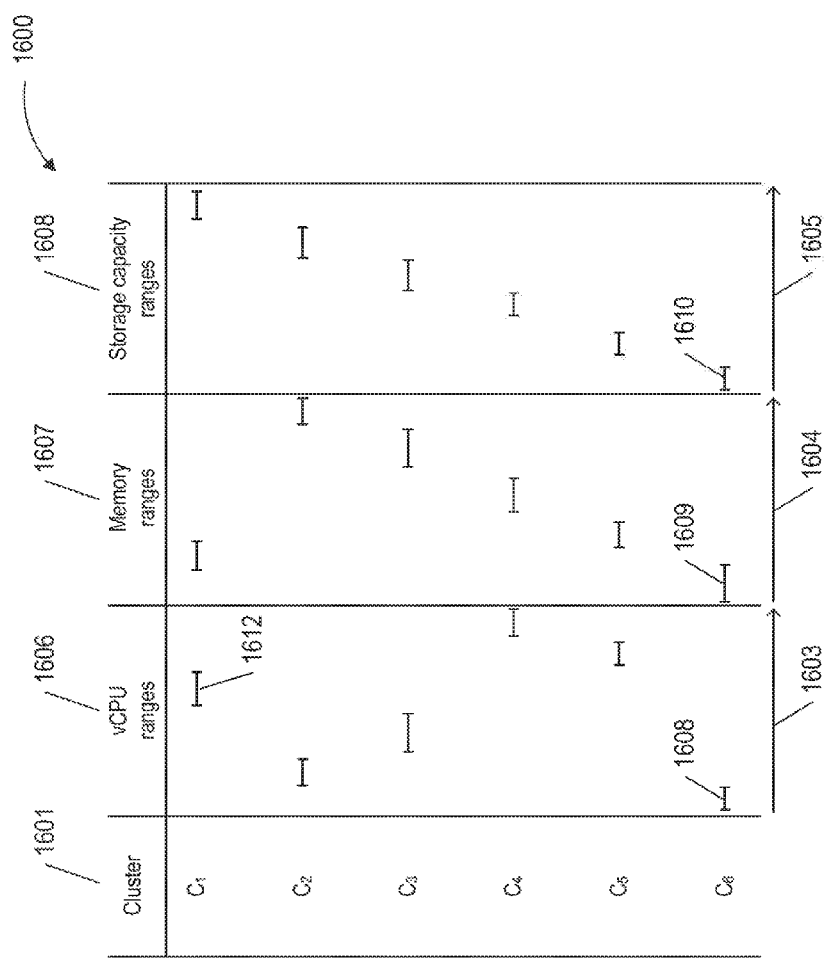
FIG. 16 shows an example table of VM clusters in private cloud and costs of similar VMs in public and benchmark clouds.

FIG. 16 shows an example table 1600 that lists the VM clusters of similar VMs in the private cloud in column 1601. Directional arrows 1603-1605 represent increasing vCPU, memory, and storage capacity. Virtual CPU, memory, and storage capacity ranges for the VMs in each of the VM clusters shown in FIG. 15 are represented by intervals in columns 1606-1608, respectively. For example, the VMs comprising the cluster $C_6$ have vCPU speeds in vCPU range 1608, memory in the memory range 1609, and storage capacity in the storage capacity range 1610. Comparisons between the ranges 1608 and 1612 indicate that the VMs in the VM cluster $C_1$ have faster processing speeds than VMs in the VM cluster $C_2$.

After the VM clusters have been determined, the cost efficiency of each VM within a VM cluster is determined as described below with reference to FIGS. 17-25. The method of determining cost efficiency is then repeated for the VMs in each of the VM clusters.

Each VM in a VM cluster $C_s$ has a VM cost denoted by cst(n, $C_s$), where n=1, . . . , N, and N is the number of VMs in the VM cluster $C_s$. The VMs in the VM cluster $C_s$ are rank ordered according to VM cost and a percentile is computed for cost of each VM as follows:

$$p_n = \frac{100}{N}\left(n - \frac{1}{2}\right) \quad (4)$$

Figure 17:
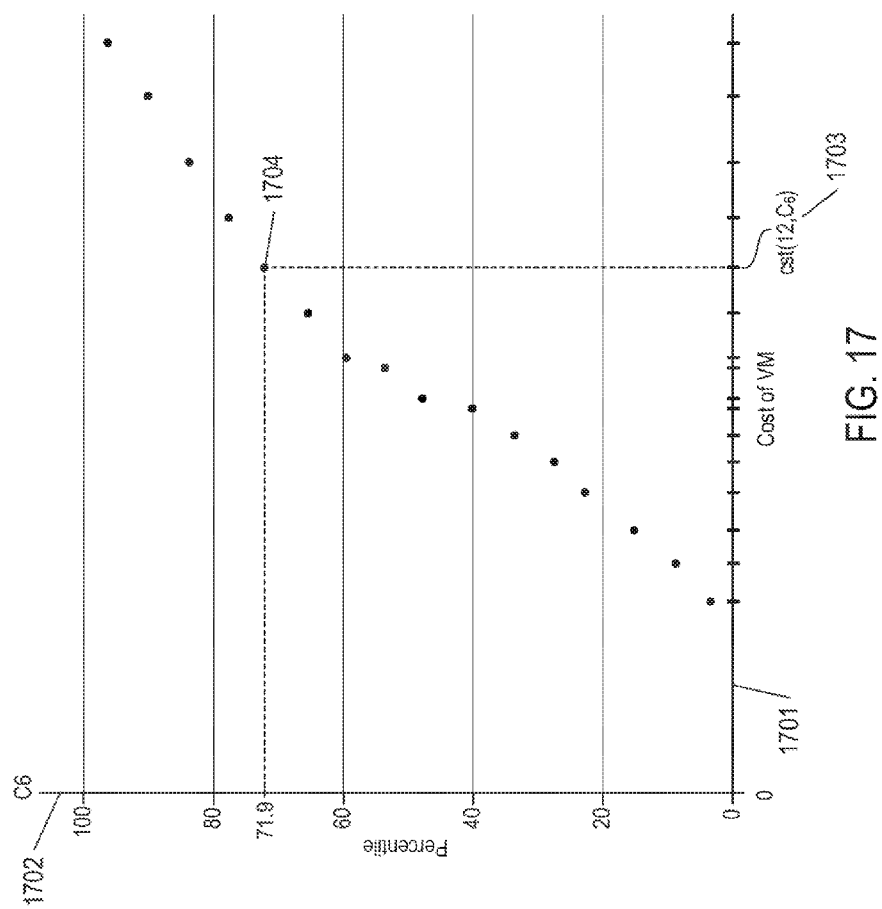
FIG. 17 shows a plot of percentile versus rank ordered cost of VMs in a VM cluster.

FIG. 17 shows a plot of percentile versus rank ordered cost of VMs in the VM cluster $C_6$ shown in FIG. 15. Axis 1701 is a cost of VM axis, and vertical axis 1702 is percentile axis that ranges from 0 to 100. Marks, such as mark 1703, located along the cost of VM axis 1701 represent the cost, cst(n, $C_6$), of each VM in the VM cluster $C_6$, where n=1, . . . , 16. Dots, such as dot 1704, represent the percentile of the cost of a VM in the VM cluster $C_6$. For example, the cost cst(12, $C_6$) 1703 has a percentile of 71.9.

Methods then identify the M highest market share public clouds denoted by $PC_m$, based on each public cloud's market share denoted by $MS_m$, where m=1, . . . , M. The highest market share public clouds and their corresponding market share may be determined from publicly available market survey data. For example, let $PC_1$, $PC_2$, and $PC_3$ represent the three highest market share public clouds with the three highest market shares (i.e., percentage of the world cloud computing market) represented by $MS_1$, $MS_2$, and $MS_3$, respectively. For each of the M highest market share public clouds, the costs of the VMs that are similar to the VMs in the VM cluster $C_s$ are obtained from the market survey data.

Figure 18:
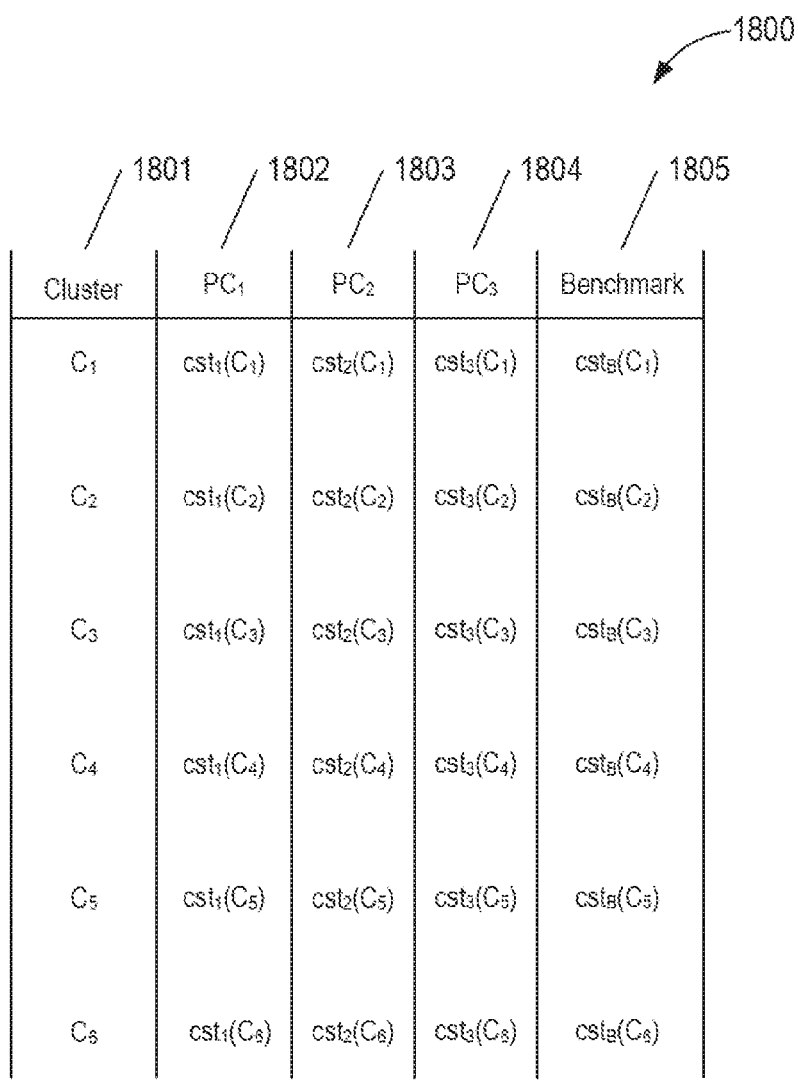
FIG. 18 shows an table of example costs of VMs of three public cloud providers that are similar to VMs in a VM cluster of a private cloud.

FIG. 18 shows a table of costs of VMs in the example three highest market share public clouds $PC_1$, $PC_2$, and $PC_3$ that are similar to the VMs in the VM clusters of the private cloud. Column 1801 lists the six VM clusters of the private cloud and columns 1802-1804 list the cost of VMs, $cst_m(C_s)$, in the three highest market share public clouds $PC_1$, $PC_2$, and $PC_3$ that are similar to the VMs in the VM cluster $C_s$. For example, the cost of the VMs in the public clouds $PC_1$, $PC_2$, and $PC_3$ that are similar to the VMs in the VM cluster $C_6$ (i.e., have vCPU, memory, and storage capacity in the ranges 1608-1610 of FIG. 16) are $cst_1(C_6)$, $cst_2(C_6)$, and $cst_3(C_6)$, respectively. Table 1800 includes a column 1805 with cost of VMs in a benchmark private cloud located within the same geographical area as the private cloud $cst_B(C_s)$. For example, $cst_B(C_6)$ represents the cost of VMs in the benchmark private cloud with vCPU, memory, and storage capacity in the ranges 1608-1610 of FIG. 16 that are similar to the VMs in the VM cluster $C_6$.

For each VM cluster $C_s$, a discrete set of VM costs, $\{PC_m(C_s)\}$, is determined for each of the M highest market share public clouds based on the market share of each of the public clouds. A discrete set of VM costs $\{PC_m(C_s)\}$ is determined for a public cloud $PC_m$ by centering a normal distribution at $cst_m(C_s)$ and computing a set of VM costs within the first standard deviation of the cost $cst_m(C_s)$.

Figure 19:
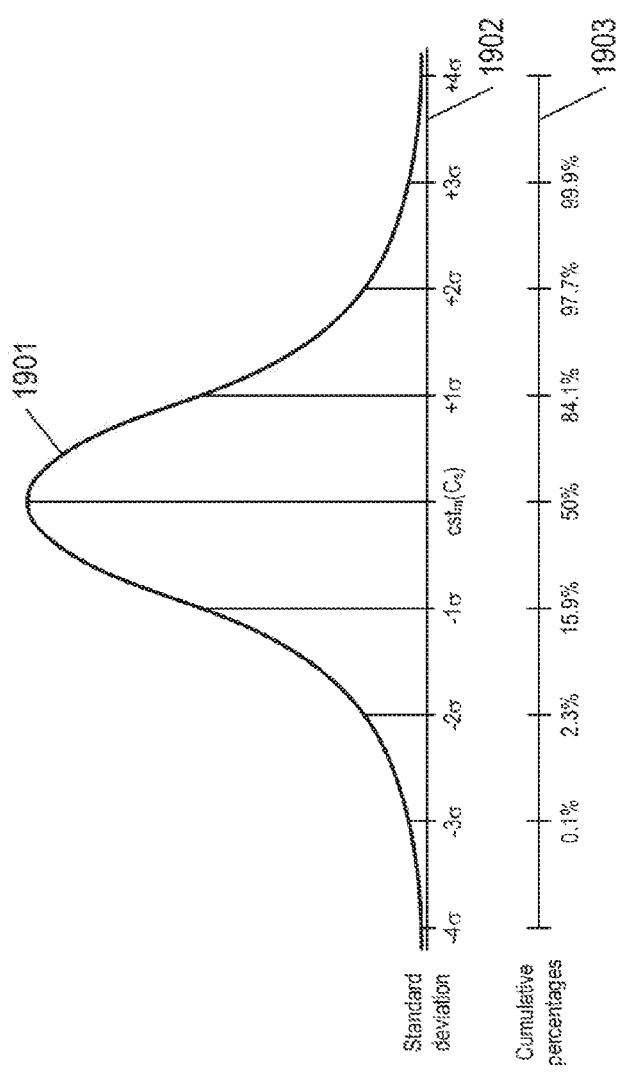
FIG. 19 shows a plot of a normal distribution.

FIG. 19 shows a plot of a normal distribution represented by curve 1901. The normal distribution 1901 is plotted with respect to standard deviations represented by axis 1902 and cumulative percentages (percentiles) represented by axis 1903. The cost $cst_m(C_s)$ is taken as the average, which corresponds to the $50^{th}$ percentile. VM costs within the first standard deviation of the cost $cst_m(C_s)$, $\pm 1\sigma$, are within the 15.9 and 84.1 percentiles. Only the costs of VMs within the 15.9 to 84.1 percentile of the cost of VMs in public cloud $PC_m$ that are similar to the VMs in the VM cluster $C_s$ are considered.

A discrete set of costs of VMs is determined by first computing discrete percentiles between the 15.9 and 84.1 percentile as follows:

$$p_m(x) = 15.9 + \left(\frac{84.1 - 15.9}{X_m - x}\right) \quad (5a)$$

where $X_m$ is the integer number of VM costs between the 15.9 and 84.1 percentiles based on the percentage market share of the public cloud $PC_m$ (e.g., $X_m = 10 \times MS_m$); and $x = 0, \ldots, (X_m - 1)$.

For example, if the market share of the public cloud $PC_m$ is 30%, then $X_m$ equals 300. A corresponding discrete set of costs of VMs for the public cloud $PC_m$ between the 15.9 and 84.1 percentiles are given by $$VMcost_{m,x}(C_s) = \left(\frac{cst_m(C_s)}{50.0}\right) p_m(x) \quad (5b)$$

where $x = 0, \ldots, (X_m - 1)$.
A set of costs of VMs is given by $$\{PC_m(C_s)\} = \{VM\,cost_{m,x}(C_s)\}_{x=0}^{X-1} \quad (5c)$$

is computed for each of the M highest market share public clouds (i.e., $m = 1, \ldots, M$).

Figure 20:
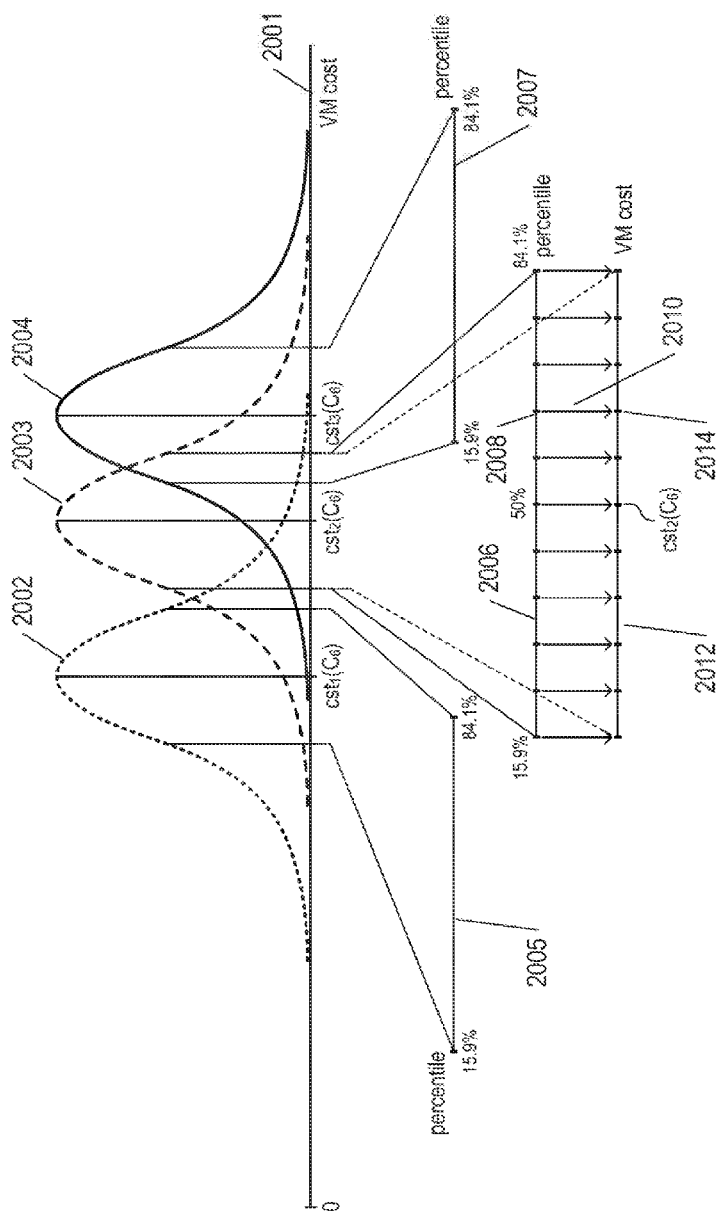
FIG. 20 shows example normal distributions centered at costs of VMs.

FIG. 20 shows example normal distributions centered at costs $cst_1(C_6)$, $cst_2(C_6)$, and $cst_3(C_6)$ of VMs in the three highest market share public clouds that are similar to the VMs in the VM cluster $C_6$ in FIG. 18. Axis 2001 represents a range of cost of VMs. Curves 2002-2004 represent normal distributions centered at the costs $cst_1(C_6)$, $cst_2(C_6)$, and $cst_3(C_6)$ of VMs in the public clouds $PC_1$, $PC_2$, and $PC_3$ that are similar to the VMs in the VM cluster $C_6$, respectively. Intervals 2005-2007 represent VM cost ranges between the 15.9 and 84.1 percentiles of the normal distributions 2002-2004, respectively. A discrete set of percentiles located along the interval 2006 are represented by points, such as point 2008, and are determined using Equation (5a) for $X_2 = 11$. Directional arrows, such as direction arrow 2010, represent converting each of the discrete percentiles in the interval 2006 into the discrete VM costs in the interval 2012 using Equation (5b), such as converting the percentile 2008 into the VM cost 2014. The sets of VM costs of VMs in the public clouds $PC_1$, $PC_2$, and $PC_3$ that are similar to the VMs in the VM cluster $C_6$ are denoted by $\{PC_1(C_6)\}$, $\{PC_2(C_6)\}$, and $\{PC_3(C_6)\}$, respectively.

Sets of private cloud and benchmark private cloud costs of VMs similar to the VMs in the VM cluster $C_s$ are computed as follows. The benchmark private cloud is a private cloud typically located in the same geographical region as the private cloud. Market survey data is used to determine the market share of private versus public clouds represented by $$MS_{pri} + MS_{pub} = 100\% \quad (6)$$

where $MS_{pri}$ is the market share of private clouds; and $MS_{pub}$ is the market share of public clouds.

The number of VMs is distributed between the private cloud and the benchmark private cloud based on the market share of private clouds as follows:

$$NO_{pri} + NO_{ben} = T \times MS_{pri} \quad (7)$$

where $NO_{pri}$ is a representative number of VMs in the VM cluster $C_s$ private cloud;

$NO_{ben}$ is a representative number of VMs in of VMs in the benchmark private cloud that are similar to the VMs in the VM cluster $C_s$; and T is an integer value (e.g., T=10).

For example, suppose the market share of private clouds is 40% (i.e., $MS_{pri} = 40\%$). With T equal to 10 in Equation (7), the number of VMs distributed between the private cloud and the benchmark private cloud may be taken as 400 (i.e., $NO_{pri} + NO_{ben} = 400$).

Methods use a weighting function based on the number of VMs in the private cloud. As the number of VMs in the VM cluster of the private cloud increases, more weight is given to the private cloud than the benchmark private cloud. And as the number of VMs in the VM cluster of the private cloud decreases, less weight is given to the private cloud than to the benchmark private cloud. The percentage weight given to the VMs in the benchmark private cloud that are similar to the VMs in the VM cluster of the private cloud is given by a percentage weight function:

$$f(y) = 75 - 50 \times \exp\left(\frac{-y}{100}\right) \quad (8)$$

where y is the number of VMs in a VM cluster of the private cloud.

Figure 21:
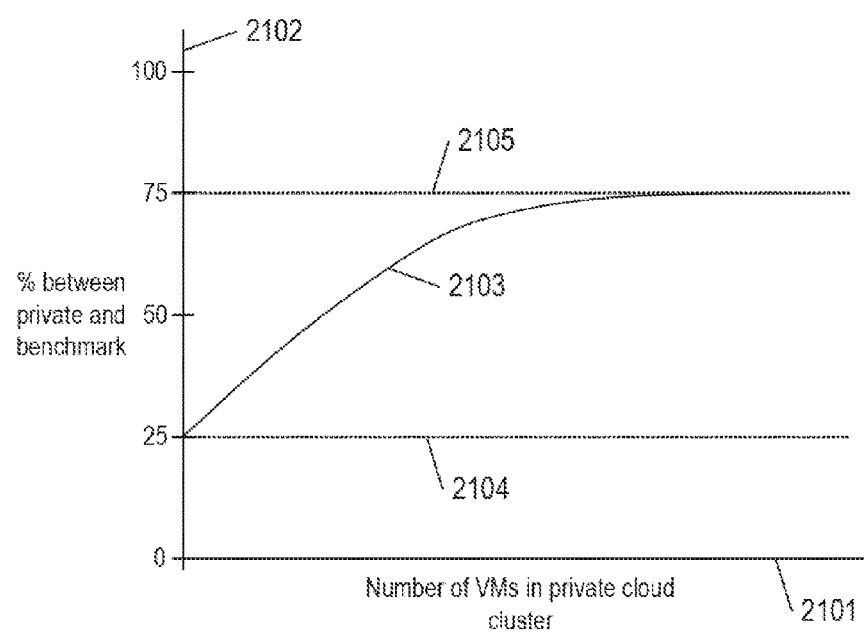
FIG. 21 shows a plot of a percentage weight function.

FIG. 21 shows a plot of a percentage weight function. Axis 2101 represents the number of VMs in the VM cluster of the private cloud, and axis 2102 represents the percentage of VMs to be given to the benchmark private cloud. Curve 2103 represents a percentage weight function that lies between 25% and 75% identified by dashed lines 2104 and 2105.

Note that calculation of the percentage weight is not limited to the percentage weight function given by Equation (8). In practice, any function that displays a similar shape to the function shown in FIG. 21 may be used. For example, functions based on S curves may be used to determine the percentage weight given to the VMs the benchmark private cloud.

Using Equation (8), the representative number of VMs in the private cloud is given by $$NO_{pri} = T \times MS_{pri}\left(1 - \frac{f(y)}{100}\right) \qquad (9a)$$

and the representative number of VMs in the benchmark private cloud is given by $$NO_{ben} = T \times MS_{pri}\left(\frac{f(y)}{100}\right) \qquad (9b)$$

Cost of VMs in the benchmark private cloud that are similar to the VMs in the VM cluster $C_s$ are computed by centering a normal distribution at $cst_B(C_s)$ and computing the discrete set of $NO_{ben}$ VM costs within the first standard deviation of the cost $cst_m(C_s)$, as described above with reference to FIG. 20.

Figure 22:
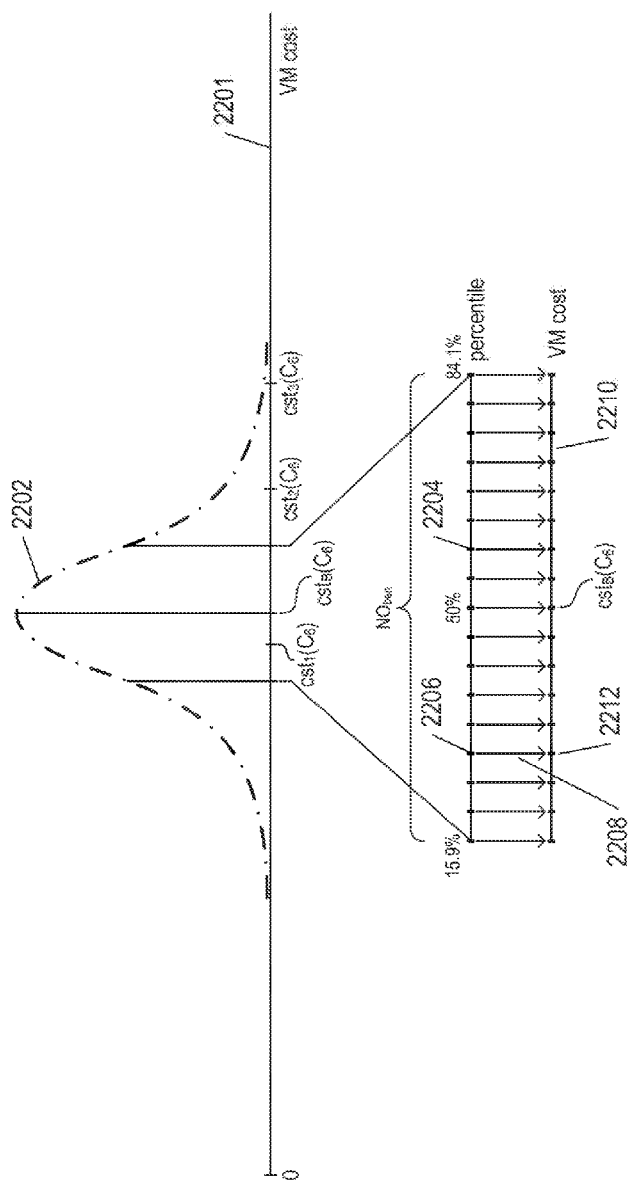
FIG. 22 shows an example normal distribution centered at cost of VMs in a benchmark private cloud.

FIG. 22 shows an example normal distribution 2202 centered at cost $cst_B(C_6)$ of VMs in the benchmark private cloud that are similar to the VMs in the VM cluster $C_6$ in FIG. 18. Axis 2201 represents a cost range of VMs. An interval 2204 represent a range of VM costs between the 15.9 and 84.1 percentiles of the normal distribution 2202. A discrete set of percentiles located along the interval 2204 are represented by points, such as point 2206, and are determined using Equation (5a) for $X_6=NO_{ben}$. Directional arrows, such as direction arrow 2208, represent converting each of the discrete percentiles in the interval 2204 into the discrete VM costs in the interval 2010 using Equation (5b), such as converting the percentile 2206 into the VM cost 2212. The set of VM costs of VMs in the benchmark private cloud that are similar to the VMs in the VM cluster $C_6$ are denoted by {benchmark($C_6$)}.

Figure 23:
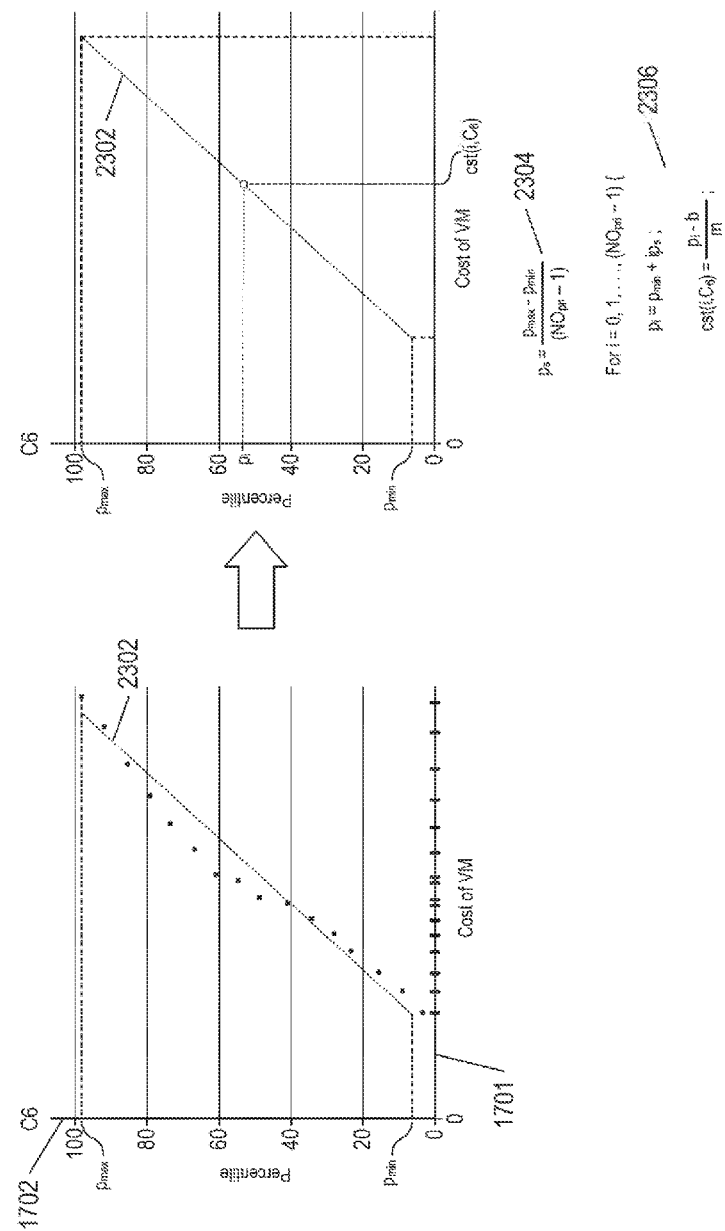
FIG. 23 shows a plot of percentile versus rank ordered cost of VMs in a VM cluster.

The set of VM costs for a representative VM cluster of the private cloud are computed from the percentile versus cost of VMs for the VM cluster shown in FIG. 17. Curve fitting is used to fit a curve to the percentile versus costs of VMs for the VM cluster. FIG. 23 shows the plot of percentile versus rank ordered cost of VMs in the VM cluster $C_6$ shown in FIG. 17. Because the percentile versus cost of VMs exhibit linear dependence, a line 2302 is fit to the percentile versus cost of VMs. For example, the slope, m, and percentile axis intercept, b, of the line 2302 may be determined using linear least square. The line 2302 is used to compute a set of $NO_{pri}$ VM cost for a representative VM cluster of the private cloud. A step size between discrete percentile data points in an interval between a minimum percentile, $p_{min}$, and a maximum percentile, $p_{max}$, is determined by equation 2304. A for-loop 2306 can be used to compute a set of $NO_{pri}$ VM costs of a representative VM cluster of the private cloud, {private($C_6$)}={cst(i, $C_6$)}, for i=0, . . . , $NO_{pri}$−1.

Note that the set of VM costs of the representative VM cluster, {private($C_6$)}, is not composed of the VM costs in the VM cluster $C_6$ but is instead composed of VM costs computed from the VM costs of VMs comprising the VM cluster $C_6$ and the representative number $NO_{pri}$.

In the example of FIGS. 17 and 23, the relationship between the percentiles and the associated cost of VMs is linear. In practice, the relationship between the percentiles and the associated cost of VMs may be nonlinear, in which case a nonlinear curve fitting technique may be used to determine parameters of a function that approximates the relationship between the percentiles and the costs of VMs in a VM cluster.

The sets of VM costs, {private($C_s$)},{benchmark($C_s$)}, and {$PC_m(C_s)$}, for m=1, . . . , M, are collected to form a merged set of VM costs given by:

$$\{VM\_cost(C_s)\} = \left(\bigcup_{m=1}^{M}\{PC_m(C_s)\}\right) \cup \{benchmark(C_s)\} \cup \{private(C_s)\} \qquad (8)$$

The merged set of VM costs are rank ordered and a VM cost-versus-percentile curve is computed for the rank ordered merged set of VM costs.

A cost-versus-percentile function, p(z), is fit to the merged set of VM costs {VM_cost($C_s$)}, where z represents cost of VMs. For each of the N VM costs cst(n, $C_s$) of VMs in the VM cluster $C_s$, a cost-versus-percentile function p(cst(n,$C_s$)) is computed. For each VM in the VM cluster $C_s$, a cost efficiency is computed as follows:

$$cost\_eff_n(C_s)=100-p(cst(n,C_s)) \qquad (9)$$

The cost efficiencies of the N VMs in the VM cluster $C_s$ are collected to form a set of cost efficiencies {cost_eff$_n(C_s)$}, for n=1, . . . , N.

Each of the cost efficiencies may then be compared with a cost efficiency threshold, $T_{cf}$. When cost_eff$_n(C)>T_{cf}$, an alert is generated and a recommendation may be given to move the associated VM to the public cloud. Alternatively, when cost_eff$_n(C_s)≤T_{cf}$, no alert is generated, indicating that the VM may remain in the private cloud.

A set of VM costs {VM_cost($C_s$)} is computed as described above for each of the VM clusters in the set of clusters {$C_s$} (i.e., for s=1, . . . , S). The cost efficiencies of the VMs in the VM clusters are computed according to Equation (9) and are compared to the cost efficiency threshold in order to assess the cost efficiency of each VM and recommend moving VMs with cost efficiencies that violate the threshold to be moved to the public cloud.

For example, the sets of VM costs {private($C_6$)},{benchmark($C_6$)},{$PC_1(C_6)$}, {$PC_2(C_6)$}, and {$PC_3(C_6)$} described above are merged to form a merged set of VM costs for the VM cluster $C_6$ as follows:

$$\{VM\_cost(C_6)\} = \qquad (10)$$
$$\left(\bigcup_{m=1}^{3}\{PC_m(C_6)\}\right) \cup \{benchmark(C_6)\} \cup \{private(C_6)\}$$

The VM costs in the merged set of VM costs are rank ordered from lowest cost VM to highest cost VM, and a VM cost-versus-percentile curve is computed for the rank ordered set of VM costs.

Figure 24:
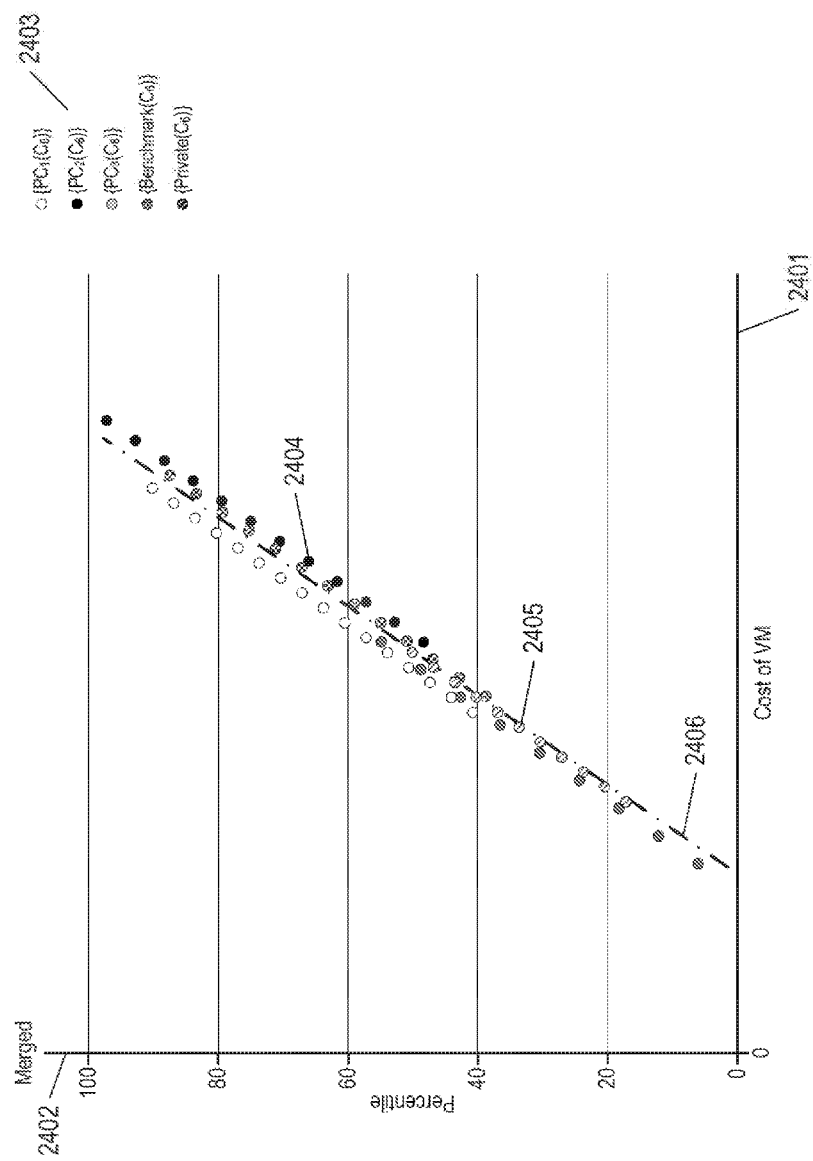
FIG. 24 shows an example of a merged set of VM costs.

FIG. 24 shows an example of a merged set of VM costs {VM_cost($C_6$)} for the VM cluster $C_6$. Axis 2401 represents a range of cost of VMs, and axis 2402 represents a range of percentiles. Differently shaded circles represent the VM costs in one of the sets comprising the merged set of VM costs (VM_cost($C_6$)). A legend 2403 shows how the differently shaded circles correspond to the sets comprising the merged set of costs {VM_cost($C_6$)}. For example, black circle 2404 represents a VM cost in the set {$PC_2(C_6)$} and hash-marked circle 2405 represents a VM cost in the set (private($C_6$)). In the example of FIG. 24, a cost-versus-percentile function, p(z), represented by dot-dashed line 2406, is fit to the merged set of VM costs. Parameters of the cost-versus-percentile function p(z) may be determined using linear least squares or another curve fitting technique. The cost-versus-percentile function is used to compute the percentile p(cst(n, $C_6$)) for each of the sixteen VM costs, cst(n, $C_6$).

Figure 25:
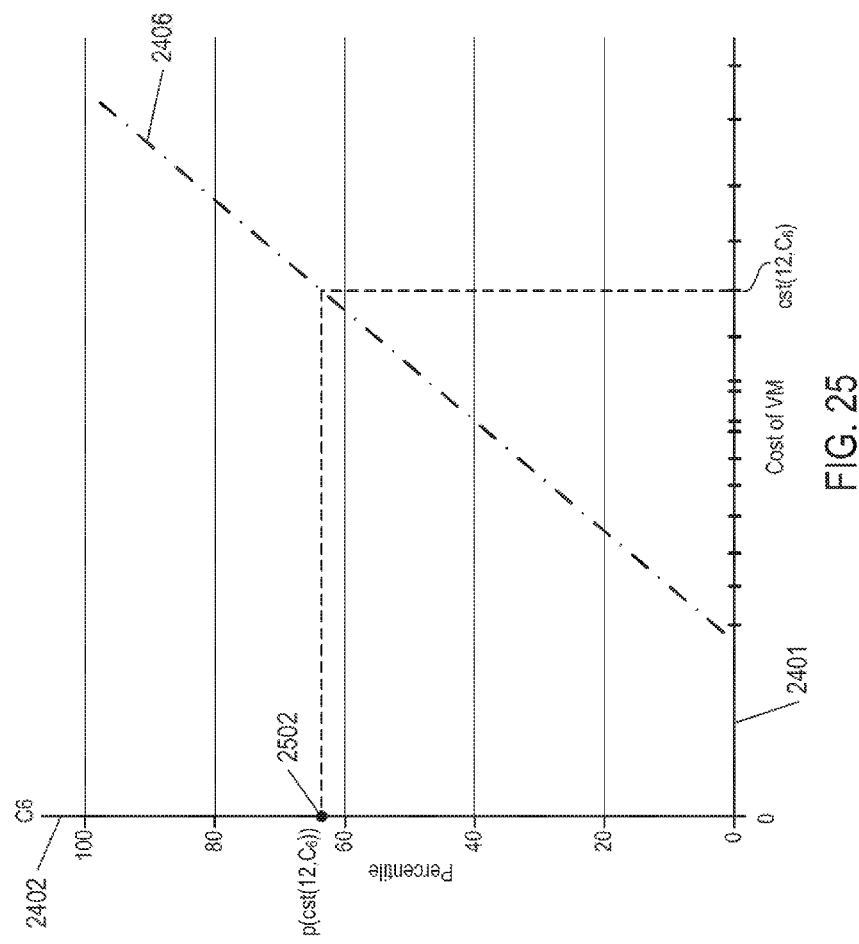
FIG. 25 shows a plot of a linear function and rank ordered costs of the VMs in a VM cluster.

FIG. 25 shows a plot of the linear function p(z) 2406 and the rank order costs cst(n, $C_6$) of the VMs in the VM cluster $C_6$ along the cost of VM axis 2401. Percentile 2502 represents the percentile p(cst(11, $C_6$)) computed for the cost cst(11, $C_6$). The cost efficiency for the VM with the VM cost cst(11, $C_6$) is $$\text{cost\_eff}_{11}(C_6) = 100 - p(cst(11, C_6))$$

Figure 26:
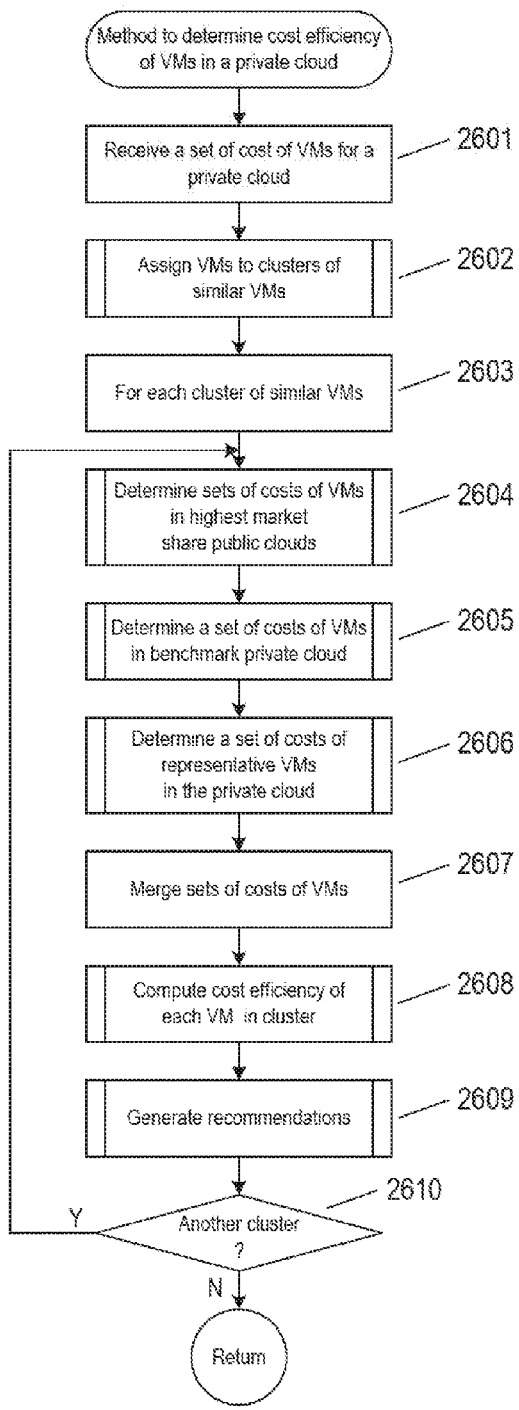
FIG. 26 shows a control-flow diagram of a method to determine cost efficiency of VMs in a private cloud.

FIG. 26 shows a control-flow diagram of a method to determine cost efficiency of VMs in a private cloud. In block 2601, a set of costs of VMs in a private cloud are received. In block 2602, a routine "assign VMs to clusters of similar VMs" is called to assign the VMs to VM clusters as described above with reference to FIG. 15. A for-loop beginning with block 2603 repeats the computational operations described below with reference to blocks 2604-2610 for each cluster of VMs. In block 2604, a routine to "determine sets of costs of VMs in highest market share public clouds" is called. In block 2605, a routine to "determine a set of costs of VMs in a benchmark private cloud" is called. In block 2606, a routine to "determine a set of costs of representative VMs in the private cloud" is called. In block 2607, a merged set of VM costs are determined from the sets of costs of VMs of the public clouds, the set of costs of VMs of the benchmark private clouds, and the set of costs of representative VMs. In block 2908, a routine to "compute cost efficiency of each VM in the VM cluster" is called. In block 2609, a routine to "generate recommendations" based on the cost efficiencies is called. In decision block 2609, the operations in blocks 2604-2609 are repeated for another VM cluster.

Figure 27:
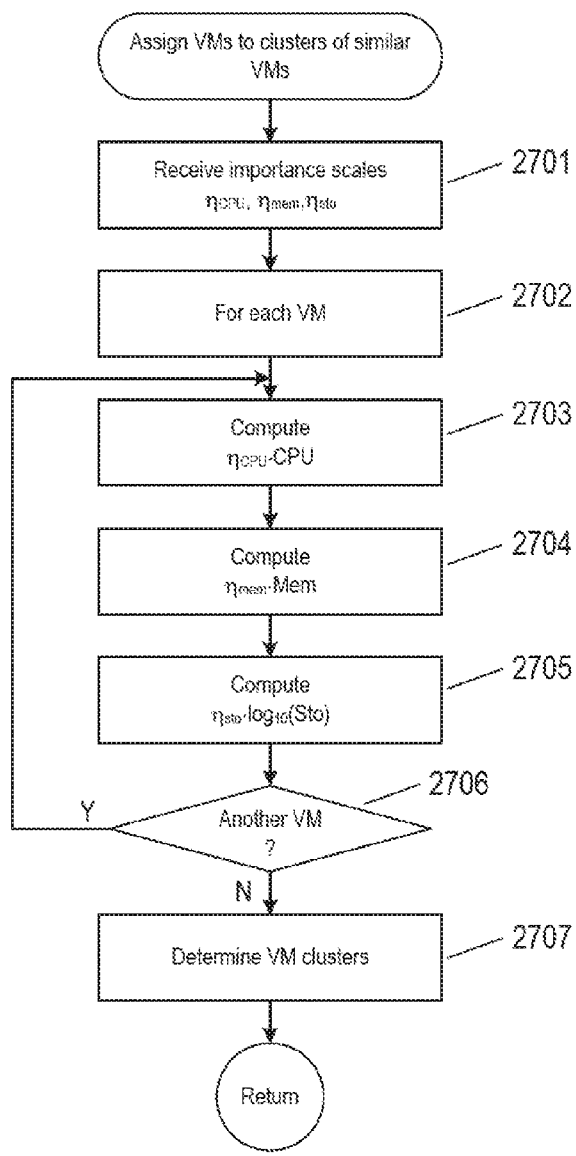
FIG. 27 shows a control-flow diagram of the routine "assign VMs to clusters of similar VMs" called in FIG. 26.

FIG. 27 shows a control-flow diagram of the routine "assign VMs to clusters of similar VMs" called in block 2602 of FIG. 26. In block 2701, importance scale values are received. The importance scale values include a CPU scale value, a memory scale value, and a storage capacity scale value as described above with reference to Equation (1). A for-loop beginning with block 2702 repeats the operations of blocks 2703-2706 for each VM in the private cloud. In blocks 2703-2705, the CPU scale factor, memory scale factor, and storage capacity scale factor multiply the CPU, memory, and storage capacity values of the VM to give scaled VM data point, as described above with reference to Equation (1). In decision block 2706, blocks 2703-2705 are repeated for another VM in the private cloud, otherwise control flows to block 2707. In block 2707, VMs are assigned to clusters based on the each VMs associated scale VM data point, as described above with reference to Equations (2) and (3).

Figure 28:
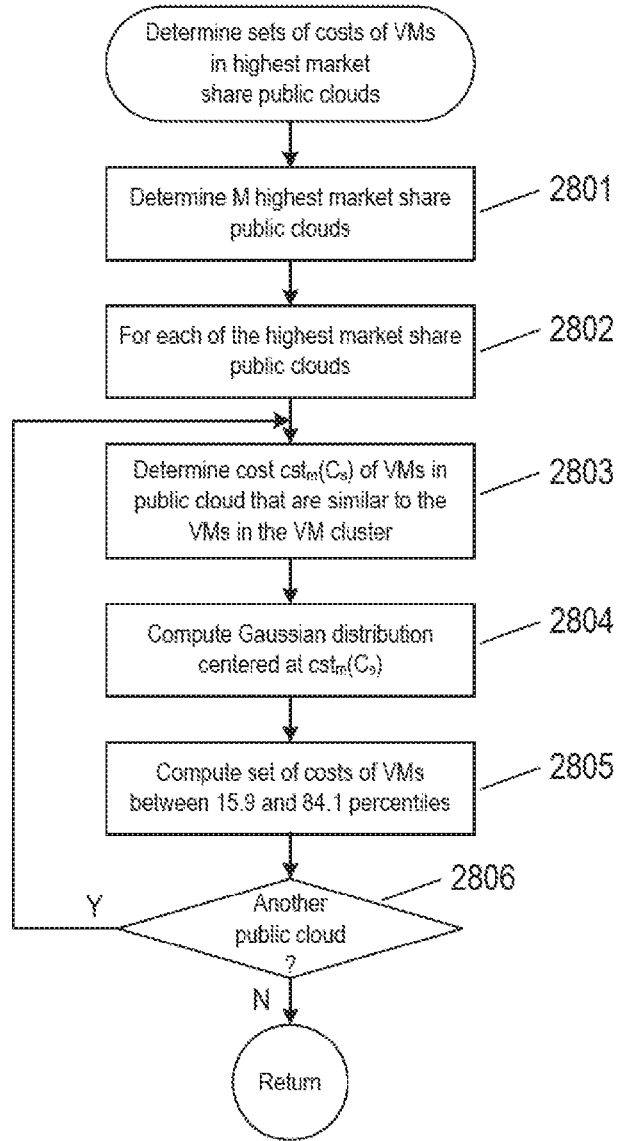
FIG. 28 shows control-flow diagram of the routine "determine cost versus sets of costs of VMs in highest market share public clouds" called in FIG. 26.

FIG. 28 shows control-flow diagram of the routine to "determine cost versus sets of costs of VMs in highest market share public clouds" called in block 2604 of FIG. 26. In block 2801, M highest market share public clouds are determined from market analysis data public and private clouds. A for-loop in block 2802 repeats the computational operations represented by blocks 2803-2805. In block 2803, a cost of VMs in public cloud $PC_m$ that are similar to the VMs in the VM cluster is determined. In block 2804, compute a normal distribution centered at the cost of the VMs. Compute set of costs of VMs between 15.9 and 84.1 percentiles of normal distribution as described above with reference to Equations (5a)-(5c).

Figures 29, 30:
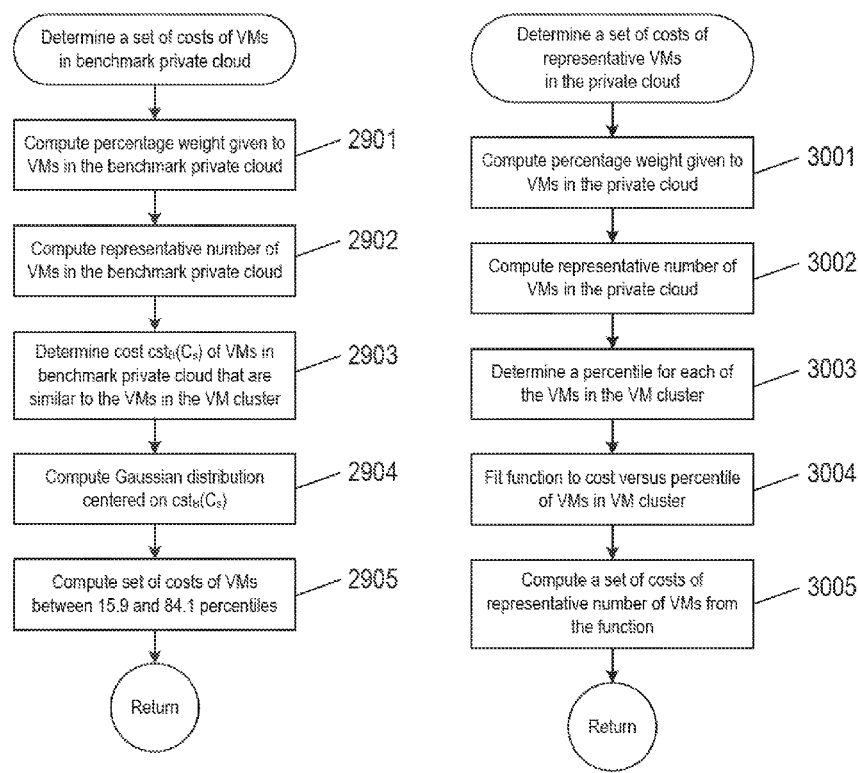
FIG. 29 shows a flow diagram of the routine "determine a set of costs of VMs in benchmark private cloud" called in FIG. 26.
FIG. 30 shows a flow diagram of the routine "determine a set of costs of representative VMs in the private cloud" called in block 2905 in FIG. 29.

FIG. 29 shows a flow diagram of the routine "determine a set of costs of VMs in benchmark private cloud" called in block 2605 of FIG. 26. In block 2901, compute percentage weight given to VMs in the benchmark private cloud based on the number VMs in the VM cluster as described above with reference to percentage weight function in Equation (8). In block 2902, compute representative number of VMs in the benchmark private cloud as described above with reference to Equation (9b). In block 2903, a cost of VMs in benchmark private cloud that are similar to the VMs in the VM cluster is determined. In block 2904, compute a normal distribution centered at the cost of the VMs. In block 2905, compute set of costs of VMs between 15.9 and 84.1 percentiles of normal distribution as described above with reference to Equations (5a)-(5c).

FIG. 30 shows a flow diagram of the routine to "determine a set of costs of representative VMs in the private cloud" called in block 2606 of FIG. 29. In block 3001, compute percentage weight given to VMs in the private cloud based on the number VMs in the VM cluster as described above with reference to percentage weight function in Equation (8). In block 3002, compute a representative number of VMs in the private cloud as described above with reference to Equation (9a). In block 3003, a percentile is determined for each of the costs of VMs in VM cluster, as described above with reference to Equation (4). In block 3004, a function is fit to the cost versus percentile of the VMs in the VM cluster, as described above with reference to FIG. 23. In block 3005, a set of costs of VMs is computed for the representative number of VMs using the function, as described above with reference to FIG. 23.

Figure 31:
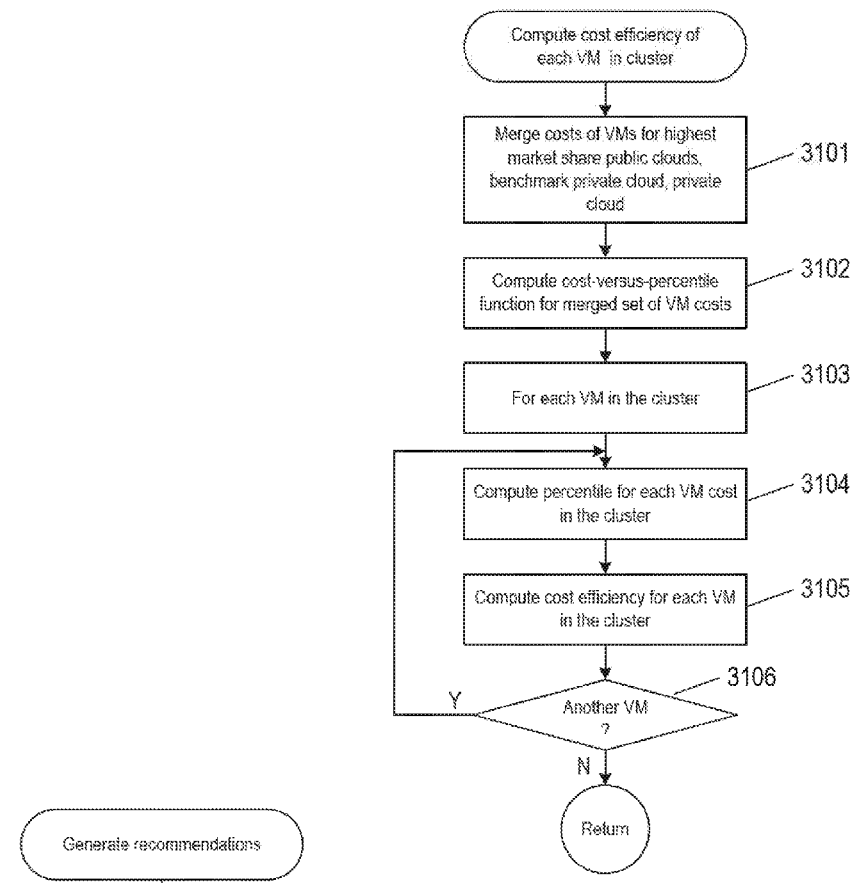
FIG. 31 shows a control-flow diagram of the routine "compute cost efficiency of each VM in the VM cluster" called in FIG. 26.

FIG. 31 shows a control-flow diagram of the routine "compute cost efficiency of each VM in the VM cluster" called in block 2608 of FIG. 26. In block 3101, the one or more sets of costs of VMs for the highest market share public clouds, the set of costs of VMs for the benchmark private cloud, and the set of costs of VMs for the representative number of VMs in the private cloud are merged to generate a merged set of costs of VMs, as described above with reference to Equation (8). In block 3102, a cost-versus-percentile function is fit to the merged set of costs of VMs, as described above with reference to FIG. 25. A for-loop beginning in block 3103 repeats the computational operations represented by blocks 3104 and 3105 for each VM in the VM cluster. In block 3104, a percentile for the cost of each VM in the VM cluster using the cost-versus-percentile function is computed. In block 3105, the cost efficiency for each VM in the VM cluster is computed based on the percentile.

Figure 32:
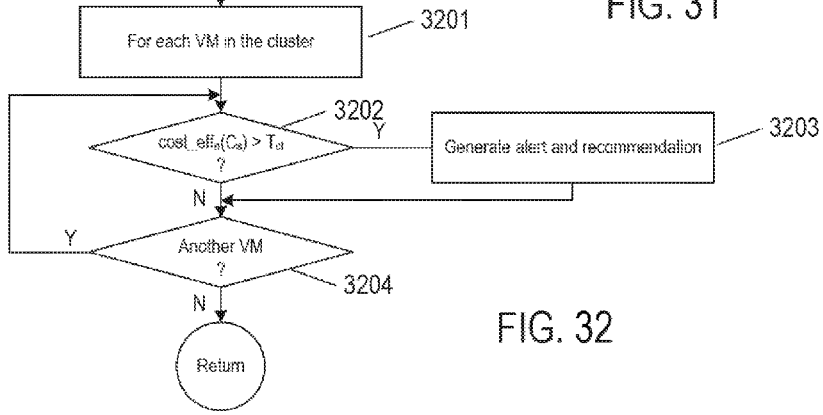
FIG. 32 shows a control-flow diagram of the routine "generate recommendations" called in FIG. 26.

FIG. 32 shows a control-flow diagram of the routine "generate recommendations" called in block 2610 of FIG. 26. A for-loop beginning with block 3201 repeats the operations represented by blocks 3202 and 3203 are repeated for each of the VMs in the VM cluster. In decision block 3202, when a cost efficiency is greater than the cost efficiency threshold, control flows to block 3203. Otherwise, the cost efficiency associated with another VMs in the VM cluster is selected.

It is appreciated that the various implementations described herein are intended to enable any person skilled in the art to make or use the present disclosure. Various modifications to these implementations will be readily apparent to those skilled in the art, and the generic principles defined herein may be applied to other implementations without departing from the spirit or scope of the disclosure. For example, any of a variety of different implementations can be obtained by varying any of many different design and development parameters, including programming language, underlying operating system, modular organization, control structures, data structures, and other such design and development parameters. Thus, the present disclosure is not intended to be limited to the implementations described herein but is to be accorded the widest scope consistent with the principles and novel features disclosed herein.

The invention claimed is:

1. A method stored in one or more data-storage devices and executed using one or more processors, the method comprising:
   assigning virtual machines ("VMs") of a private cloud to separate IM clusters based on virtual CPU, memory, and storage capacity of each VM;
   for each VM cluster,
     determining one or more sets of costs of VMs in one or more highest market share public clouds for VMs similar to the VMs in the VM cluster;
     determining a set of costs of VMs in a benchmark private cloud for VMs similar to the VMs in the VM cluster;
     determining a set of costs of representative VMs in the VM cluster;
     merging the sets of costs of VMs in the one or more highest ranked public clouds, the benchmark private cloud, and the representative VMs to generate a merged set of costs of VMs;
     computing a cost efficiency of each VM in the VM cluster based on the merged set of cost of VMs; and
     recommending that VMs be moved to a public cloud when associated cost efficiencies are greater than a cost efficiency threshold.

2. The method of claim 1, wherein assigning VMs of the private cloud to separate VM clusters further comprises:
   for each VM in the private cloud,
     multiplying CPU value of the VM by a CPU scale value to generate a scaled CPU value;
     multiplying memory value of the VM by a memory scale value to generate a scaled memory value;
     multiplying log base 10 of the storage capacity value of the VM by a storage capacity scale value to generate a scaled storage capacity value; and
   assigning each VM to one of two or more VM clusters based on the scaled CPU, memory, and storage capacity values.

3. The method of claim 1, wherein determining the one or more sets of costs of VMs in the one or more highest market share public clouds further comprises:
   determine highest market share public clouds based on market data;
   for each of the highest market share public clouds,
     determining a cost of VMs in the public cloud that are similar to die VMs in the VM cluster;
     computing a normal distribution centered at the cost of the VMs in the public cloud; and
     computing a set of costs of VMs between 15.9 and 84.1 percentiles of the normal distribution.

4. The method of claim 1, wherein determining the set of costs of VMs in the benchmark private cloud further comprises:
   computing a percentage weight given to VMs in the benchmark private cloud;
   computing a representative number of VMs in the benchmark private cloud based on the percentage weight;
   determining a cost of VMs in the benchmark private cloud that are similar to the VMs in die VM cluster;
   computing a normal distribution centered at the cost of the VMs in the benchmark, private cloud; and
   computing a set of costs of VMs for die representative number of VMs in the benchmark private cloud between 15.9 and 84.1 percentiles of the normal distribution.

5. The method of claim 1, wherein determining the set of costs of the representative VMs in the VM cluster further comprises:
   computing a percentage weight given to VMs in the benchmark private cloud;
   computing a representative number of VMs in the private cloud based on the percentage weight;
   determining a percentile for each of the costs of VMs in VM cluster;
   fitting a function to cost versus percentile of the VMs in the VM cluster; and
   computing a set of costs of VMs for the representative number of VMs in the private cloud between 15.9 and 84.1 percentiles of the normal distribution.

6. The method of claim 1, wherein computing the cost efficiency of each VM in the VM cluster further comprises:
   merging the one or more sets of costs of VMs for the highest market share public clouds, the set of costs of VMs for the benchmark private cloud, and the set of costs of VMs for the representative number of VMs in the private cloud to generate a merged set of costs of VMs;
   fitting a cost-versus-percentile function to the merged set of costs of VMs;
   for each VM in the VM cluster,
     computing a percentile for the cost of each VM in the VM cluster using the cost-versus-percentile function; and
     computing cost efficiency for each VM in the VM cluster based on percentile.

7. The method of claim 1, wherein recommending that VMs be moved to the public cloud further comprises, for each VM in the VM cluster, when the cost efficiency of the VM is greater than a cost efficiency threshold generating an alert and a recommendation to move the VM to one of a public cloud and a different private cloud.

8. A system to assess cost efficiency of VMs in a private cloud, the system comprising:
   one or more processors;
   one or more data-storage devices; and
   machine-readable instructions stored in the one or more data-storage devices that when executed using the one or more processors controls the system to carry out
   assigning virtual machines ("VMs") of a private cloud to separate VM clusters based on virtual CPU, memory, and storage capacity of each VM;
   for each VM cluster, determining one or more sets of costs of VMs in one or more highest market share public clouds for VMs similar to the VMs in the VM cluster;
determining a set of costs of VMs in a benchmark private cloud for VMs similar to the VMs in the VM cluster;
determining a set of costs of representative VMs in the VM cluster;
merging the sets of costs of VMs in the one or more highest ranked public clouds, the benchmark private cloud, and the representative VMs to generate a merged set of costs of VMs;
computing a cost efficiency of each VM in the VM cluster based on the merged set of cost of VMs; and
recommending that VMs be moved to a public cloud when associated cost efficiencies are greater than a cost efficiency threshold.

9. The system of claim 8, wherein assigning VMs of the private cloud to separate VM clusters further comprises:
for each VM in the private cloud,
multiplying CPU value of the VM by a CPU scale value to generate a scaled CPU value;
multiplying memory value of the VM by a memory scale value to generate a scaled memory value;
multiplying log base 10 of the storage capacity value of the VM by a storage capacity scale value to generate a scaled storage capacity value; and
assigning each VM to one of two or more VM clusters based on the scaled CPU, memory, and storage capacity values.

10. The system of claim 8, wherein determining the one or more sets of costs of VMs in the one or more highest market share public clouds further comprises:
determine highest market share public clouds based on market data;
for each of the highest market share public clouds,
determining a cost of VMs in the public cloud that are similar to the VMs in the VM cluster;
computing a normal distribution centered at the cost of the VMs in the public cloud; and
computing a set of costs of VMs between 15.9 and 84.1 percentiles of the normal distribution.

11. The system of claim 8, wherein determining the set of costs of VMs in the benchmark private cloud further comprises:
computing a percentage weight given to VMs in the benchmark private cloud;
computing a representative number of VMs in the benchmark private cloud based on the percentage weight;
determining a cost of VMs in the benchmark private cloud that are similar to the VMs in the VM cluster;
computing a normal distribution centered at the cost of the VMs in the benchmark private cloud; and
computing a set of costs of VMs for the representative number of VMs in the benchmark private cloud between 15.9 and 84.1 percentiles of the normal distribution.

12. The system of claim 8, wherein determining the set of costs of the representative VMs in the VM cluster further comprises:
computing a percentage weight given to VMs in the benchmark private cloud;
computing a representative number of VMs in the private cloud based on the percentage weight;
determining a percentile for each of the costs of VMs in VM cluster;
fitting a function to cost versus percentile of the VMs in the VM cluster; and
computing a set of costs of VMs for the representative number of VMs in the private cloud between 15.9 and 84.1 percentiles of the normal distribution.

13. The system of claim 8, wherein computing the cost efficiency of each VM in the VM cluster further comprises:
merging the one or more sets of costs of VMs for the highest market share public clouds, the set of costs of VMs for the benchmark private cloud, and the set of costs of VMs for the representative number of VMs in the private cloud to generate a merged set of costs of VMs;
fitting a cost-versus-percentile function to the merged set of costs of VMs;
for each VM in the VM cluster,
computing a percentile for the cost of each VM in the VM cluster using the cost-versus-percentile function; and
computing cost efficiency for each VM in the VM cluster based on percentile.

14. The system of claim 8, wherein recommending that VMs be moved to the public cloud further comprises, for each VM in the VM cluster, when the cost efficiency of the VM is greater than a cost efficiency threshold generating an alert and a recommendation to move the VM to one of a public cloud and a different private cloud.

15. A non-transitory computer-readable medium encoded with machine-readable instructions that implement a method carried out by one or more processors of a computer system to perform the operations of
assigning virtual machines ("VMs") of a private cloud to separate VM clusters based on virtual CPU, memory, and storage capacity of each VM;
for each VM cluster,
determining one or more sets of costs of VMs in one or more highest market share public clouds for VMs similar to the VMs in the VM cluster;
determining a set of costs of VMs in a benchmark private cloud for VMs similar to the VMs in the VM cluster;
determining a set of costs of representative VMs in the VM cluster;
merging the sets of costs of VMs in the one or more highest ranked public clouds, the benchmark private cloud, and the representative VMs to generate a merged set of costs of VMs;
computing a cost efficiency of each VM in the VM cluster based on the merged set of cost of VMs; and
recommending that VMs be moved to a public cloud when associated cost efficiencies are greater than a cost efficiency threshold.

16. The medium of claim 15, wherein assigning VMs of the private cloud to separate VM clusters further comprises:
for each VM in the private cloud,
multiplying CPU value of the VM by a CPU scale value to generate a scaled CPU value;
multiplying memory value of the VM by a memory scale value to generate a scaled memory value;
multiplying log base 10 of the storage capacity value of the VM by a storage capacity scale value to generate a scaled storage capacity value; and
assigning each VM to one of two or more VM clusters based on the scaled CPU, memory, and storage capacity values.

17. The medium of claim 15, wherein determining the one or more sets of costs of VMs in the one or more highest market share public clouds further comprises:
   determine highest market share public clouds based on market data;
   for each of the highest market share public clouds,
      determining a cost of VMs in the public cloud that are similar to the VMs in the VM cluster;
      computing a normal distribution centered at the cost of the VMs in the public cloud; and
      computing a set of costs of VMs between 15.9 and 84.1 percentiles of the normal distribution.

18. The medium of claim 15, wherein determining the set of costs of VMs in the benchmark private cloud further comprises:
   computing a percentage weight given to VMs in the benchmark private cloud;
   computing a representative number of VMs in the benchmark private cloud based on the percentage weight;
   determining a cost of VMs in the benchmark private cloud that are similar to the VMs in the VM cluster;
   computing a normal distribution centered at the cost of the VMs in the benchmark private cloud; and
   computing a set of costs of VMs for the representative number of VMs in the benchmark private cloud between 15.9 and 84.1 percentiles of the normal distribution.

19. The medium of claim 15, wherein determining the set of costs of the representative VMs in the VM cluster further comprises:
   computing a percentage weight given to VMs in the benchmark private cloud;
   computing a representative number of VMs in the private cloud based on the percentage weight;
   determining a percentile for each of the costs of VMs in VM cluster;
   fitting a function to cost versus percentile of the VMs in the VM cluster; and
   computing a set of costs of VMs for the representative number of VMs in the private cloud between 15.9 and 84.1 percentiles of the normal distribution.

20. The medium of claim 15, wherein computing the cost efficiency of each VM in the VM cluster further comprises:
   merging the one or more sets of costs of VMs for the highest market share public clouds, the set of costs of VMs for the benchmark private cloud, and the set of costs of VMs for the representative number of VMs in the private cloud to generate a merged set of costs of VMs;
   fitting a cost-versus-percentile function to the merged set of costs of VMs;
   for each VM in the VM cluster,
      computing a percentile for the cost of each VM in the VM cluster using the cost-versus-percentile function; and
      computing cost efficiency for each VM in the VM cluster based on percentile.

21. The medium of claim 15, wherein recommending that VMs be moved to the public cloud further comprises, for each VM in the VM cluster, when the cost efficiency of the VM is greater than a cost efficiency threshold generating an alert and a recommendation to move the VM to one of a public cloud and a different private cloud.

* * * * *